US012739908B2

(12) United States Patent
Peng et al.

(10) Patent No.: US 12,739,908 B2
(45) Date of Patent: Sep. 15, 2026

(54) DATA EDGE PROTOCOL-BASED COMMUNICATION METHOD AND APPARATUS

(71) Applicant: HUAWEI TECHNOLOGIES CO., LTD., Shenzhen (CN)

(72) Inventors: Chenghui Peng, Shanghai (CN); Mingzeng Dai, Shenzhen (CN); Jianjun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/166,002

(22) Filed: Feb. 8, 2023

(65) Prior Publication Data

US 2023/0189365 A1 Jun. 15, 2023

Related U.S. Application Data

(63) Continuation of application No. PCT/CN2021/108233, filed on Jul. 23, 2021.

(30) Foreign Application Priority Data

Aug. 17, 2020 (CN) ........................ 202010827483.8

(51) Int. Cl.
*H04W 76/12* (2018.01)
*H04W 76/15* (2018.01)

(52) U.S. Cl.
CPC .......... *H04W 76/15* (2018.02); *H04W 76/12* (2018.02)

(58) Field of Classification Search
CPC ..... H04W 76/15; H04W 76/12; H04W 76/50; H04W 76/11; H04W 76/14; H04W 80/02;
(Continued)

(56) References Cited

U.S. PATENT DOCUMENTS 11,297,171 B2 * 4/2022 Chun .................... H04L 69/163
2010/0293233 A1 * 11/2010 Salam ................ H04L 12/4641 709/206

(Continued)

FOREIGN PATENT DOCUMENTS

CN 110945943 A * 3/2020 ........... H04W 72/20

OTHER PUBLICATIONS

3GPP TS 23.501, "3rd Generation Partnership Project; Technical Specification Group Services and System Aspects; System Architecture for the 5G System (5GS); Stage 2 (Release 16)", 3GPP Organizational Partners, V16.5.1, Aug. 2020, 440 pages.

*Primary Examiner* — Lakeram Jangbahadur
(74) *Attorney, Agent, or Firm* — Maier & Maier, PLLC

(57) ABSTRACT

A method may be performed through the following steps: a first communication apparatus sends a data edge protocol (DEP) session establishment request message to a second communication apparatus, where the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, and the DEP session is located at the DEP layer. The first communication apparatus receives configuration information of the DEP session from the second communication apparatus.

14 Claims, 7 Drawing Sheets

(58) Field of Classification Search
CPC ..... H04L 69/26; H04L 69/324; H04L 67/289; H04L 67/10
See application file for complete search history.

(56) References Cited

U.S. PATENT DOCUMENTS

2022/0053449 A1* 2/2022 Shan ................. H04W 36/0066
2022/0191100 A1* 6/2022 Kim .................... H04L 41/0853
2023/0050403 A1* 2/2023 Das ..................... H04L 12/2801

* cited by examiner

DATA EDGE PROTOCOL-BASED COMMUNICATION METHOD AND APPARATUS

CROSS-REFERENCE TO RELATED APPLICATIONS

This application is a continuation of International Patent Application No PCT/CN2021/108233. filed on Jul. 23, 2021, which claims priority to Chinese Patent Application No. 202010827483.8, filed on Aug. 17, 2020. The disclosures of the aforementioned applications are hereby incorporated by reference in their entireties.

TECHNICAL FIELD

The embodiments relate to the field of communication technologies, and a data edge protocol-based communication method, and an apparatus.

BACKGROUND

With commercial deployment of a network and emergence of an industry application, a requirement on a computing resource (which may be referred to as a computing power) is increasingly high. Some communication scenarios have high requirements on real-time performance of a computing task. Generally, a computing request of a terminal device needs to pass through a data computing center, and the data computing center is owned by a data provider. Generally, the data computing center is deployed far away from a wireless network. If data is directly transmitted through a remote data computing center, data transmission time is long, which causes delay loss and cannot meet the real-time requirement of the computing task.

A mobile edge computing (MEC) resource can be considered as a cloud server running a specific task at an edge of the wireless network. The computing resource is deployed in an area close to the terminal device, to introduce the computing resource to a wireless access network. Currently, an actual deployment location of the MEC in the wireless network is usually a local user plane function (UPF) network element corresponding to a core network. An application of the MEC combines an existing local offloading mechanism of core network data to move a service data processing location from a source data network to a local MEC. To be specific, an application that processes the service data is moved from a physical deployment location to a location near the core network of the wireless network, or even co-located with a local UPF. The MEC technology reduces a processing delay of the computing task to some extent.

However, the processing delay of the computing task needs to be further reduced.

SUMMARY

The embodiments may provide a data edge protocol-based communication method and apparatus, to reduce a processing delay of a computing task.

According to a first aspect, a data edge protocol-based communication method is provided. The method may be performed by a terminal device, or may be performed by a component (for example, a processor, a chip, or a chip system) of the terminal device. An example in which the method is performed by a first communication apparatus is used for description. The first communication apparatus may be a terminal device, or may be a component (for example, a processor, a chip, or a chip system) of the terminal device. The second communication apparatus may be a network device, or may be a component (for example, a processor, a chip, or a chip system) of the network device. The method may be implemented by using the following steps: The first communication apparatus sends a data edge protocol (DEP) session establishment request message to the second communication apparatus, where the DEP session establishment request message is used to request to establish a DEP session between the first communication apparatus and a computing power, and the DEP session is used to transmit data of a first application. The first communication apparatus receives configuration information of the DEP session from the second communication apparatus. The DEP session is established between the terminal device and the network device, direct data transmission between the terminal device and the first application can be implemented by using the DEP session, and one-hop direct transmission is implemented by using the network device, thereby reducing a path for data exchange between the terminal device and the application. Therefore, compared with an existing edge computing technology, this method can further reduce a delay variation, and implement a same service while reducing network resource overheads.

The first communication apparatus, the second communication apparatus, and the computing power may all have a function of a DEP layer.

The DEP layer may be located below a third layer. Optionally, the third layer may include a radio resource control (RRC) layer. Optionally, the DEP layer may be located above a media access control (MAC) layer and a physical (PHY) layer.

The data edge protocol may include one or more of the following fields: a field indicating a DEP type, a field indicating an identifier of the DEP session, a field indicating a priority of the DEP session, a field indicating a source DEP address, a field indicating a destination DEP address, or a DEP payload.

The first communication apparatus may send a first message to the second communication apparatus, where the first message is used to request to perform DEP registration for the first application.

The first communication apparatus may send uplink DEP data to the second communication apparatus, where the uplink DEP data includes the identifier of the DEP session.

The uplink DEP data may further include one or more types of the following information: the priority of the DEP session, the source DEP address, or the destination DEP address. The network device may schedule the uplink DEP data based on the priority of the DEP session.

The configuration information of the DEP session may include one or more pieces of the following information: the identifier of the DEP session, a DEP address of the computing power, computing resource information of the computing power, the priority of the DEP session, or a radio bearer of the DEP session.

According to a second aspect, a data edge protocol-based communication method is provided. The method may be performed by a network device, or may be performed by a component (for example, a processor, a chip, or a chip system) of the network device. An example in which the method is performed by a second communication apparatus is used for description. The second communication apparatus may be a network device, or may be a component (for example, a processor, a chip, or a chip system) of the network device. The first communication apparatus may be a terminal device, or may be a component (for example, a processor, a chip, or a chip system) of the terminal device. The method may be implemented by using the following steps: The second communication apparatus receives a data edge protocol DEP session establishment request message from the first communication apparatus, where the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, and the DEP session is constructed on the DEP layer, or the DEP session is located at the DEP layer; and the second communication apparatus sends configuration information of the DEP session to the first communication apparatus. The first communication apparatus may be the terminal device or applied to the terminal device, and the second communication apparatus may be the network device or applied to the network device. The DEP session is established between the terminal device and the network device, direct data transmission between the terminal device and the first application can be implemented by using the DEP session, and one-hop direct transmission is implemented by using the network device, thereby reducing a path for data exchange between the terminal device and the application. Therefore, compared with an existing edge computing technology, this method can further reduce a delay variation, and implement a same service while reducing network resource overheads.

The second communication apparatus may send, based on the DEP session, uplink DEP data from the first communication apparatus to the computing power (or the first application on the computing power), and/or sends downlink DEP data from the computing power (or the first application on the computing power) to the first communication apparatus.

The third layer of the radio network protocol layer may include a radio resource control (RRC) layer.

The DEP layer may be located above a media access control (MAC) layer and a physical (PHY) layer.

The second communication apparatus may receive a first message from the first communication apparatus, where the first message is used to request to perform DEP registration for the first application; and the second communication apparatus sends a DEP authentication request to a DEP control unit based on the first message, where the DEP authentication request is used to request to obtain authentication information of the first communication apparatus, and the authentication information includes information about whether the first communication apparatus is qualified to use the first application.

The second communication apparatus may receive the configuration information of the DEP session from the DEP control unit.

The data edge protocol may include one or more of the following fields: a field indicating a DEP type, a field indicating an identifier of the DEP session, a field indicating a priority of the DEP session, a field indicating a source DEP address, a field indicating a destination DEP address, or a DEP payload.

The second communication apparatus may receive the uplink DEP data from the first communication apparatus, where the uplink DEP data includes the identifier of the DEP session; and the second communication apparatus establishes an association between the DEP session and a radio bearer.

The uplink DEP data may further include one or more types of the following information: the priority of the DEP session, the source DEP address, or the destination DEP address.

The second communication apparatus may receive the downlink DEP data from the first application by using the DEP session; the second communication apparatus determines, based on the association between the DEP session and the radio bearer, a radio bearer associated with the DEP session; and the second communication apparatus sends the downlink DEP data to the first communication apparatus over the radio bearer.

The second communication apparatus may select a created DEP session for the first communication apparatus; and the second communication apparatus obtains information about a computing power resource of the DEP session and a DEP address of the computing power based on the created DEP session, and adds the information about the computing power resource of the DEP session and the DEP address of the computing power to the configuration information of the DEP session. Further, the second communication apparatus may further notify the computing power that a new communication apparatus (that is, the first communication apparatus) joins the DEP session.

The configuration information of the DEP session may include one or more pieces of the following information: the identifier of the DEP session, a DEP address of the computing power, computing resource information of the computing power, the priority of the DEP session, or a radio bearer of the DEP session.

The DEP session establishment request may include information about a deployment party of the first application; and the second communication apparatus sends an authorization request to the deployment party of the first application based on the DEP session establishment request, where the authorization request is used to request the deployment party of the first application to perform authorization authentication on the DEP session.

Optionally, the second communication apparatus receives authorization information from the deployment party of the first application, where the authorization information is used to indicate that the DEP session is allowed to be authorized.

Optionally, the authorization request carries an identifier of the first communication apparatus, and the authorization information carries the priority of the DEP session. According to a third aspect, a communication apparatus is provided. The apparatus may be denoted as a first communication apparatus, and the first communication apparatus may be applied to a terminal device; or the first communication apparatus is a terminal device, may be an apparatus (for example, a chip, a chip system, or a circuit) located in the terminal device, or may be an apparatus that can be used in a matching manner with the terminal device. The apparatus has a function of implementing the method in the first aspect. The function may be implemented by hardware, or may be implemented by hardware executing corresponding software. The hardware or the software includes one or more modules corresponding to the foregoing function. The apparatus may include a communication module and a processing module. The processing module is configured to invoke the communication module to perform a receiving and/or sending function. Further, the communication module may further include a receiving module and a sending module. For example, the sending module is configured to send a data edge protocol (DEP) session establishment request message to the second communication apparatus, where the DEP session establishment request message is used to request to establish a DEP session between the first communication apparatus and a computing power, and the DEP session is used to transmit data of a first application; and the receiving module is configured to receive configuration information of the DEP session from the second communication apparatus.

The second communication apparatus may be a network device, or may be a component (for example, a processor, a chip, or a chip system) of the network device. The first communication apparatus, the second communication apparatus, and the computing power all may have a function of a DEP layer.

The DEP layer may be located below a third layer of a wireless network protocol layer. Optionally, the third layer of the radio network protocol layer may include a radio resource control (RRC) layer. Optionally, the DEP layer may be located above a media access control (MAC) layer and a physical (PHY) layer.

The data edge protocol may include one or more of the following fields: a field indicating a DEP type, a field indicating an identifier of the DEP session, a field indicating a priority of the DEP session, a field indicating a source DEP address, a field indicating a destination DEP address, or a DEP payload.

The sending module may be further configured to send a first message to the second communication apparatus, where the first message is used to request to perform DEP registration for the first application.

The sending module may be further configured to send uplink DEP data to the second communication apparatus, where the uplink DEP data includes the identifier of the DEP session.

The uplink DEP data may further include one or more types of the following information: the priority of the DEP session, the source DEP address, or the destination DEP address. The network device may schedule the uplink DEP data based on the priority of the DEP session.

The configuration information of the DEP session may include one or more pieces of the following information: the identifier of the DEP session, a DEP address of the computing power, computing resource information of the computing power, the priority of the DEP session, or a radio bearer of the DEP session.

For beneficial effects of the third aspect, refer to the corresponding descriptions of the first aspect. Details are not described herein again.

According to a fourth aspect, a communication apparatus is provided. The apparatus may be denoted as a second communication apparatus, and the second communication apparatus may be applied to a network device; or the second communication apparatus is a network device, may be an apparatus (for example, a chip, a chip system, or a circuit) located in the network device, or may be an apparatus that can be used in a matching manner with the network device. The apparatus has a function of implementing the method in the second aspect. The function may be implemented by hardware or may be implemented by hardware executing corresponding software. The hardware or the software includes one or more modules corresponding to the foregoing function. The apparatus may include a communication module and a processing module. The processing module is configured to invoke the communication module to perform a receiving and/or sending function. Further, the communication module may further include a receiving module and a sending module. For example, the receiving module is configured to receive a data edge protocol (DEP) session establishment request message from the first communication apparatus, where the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, and the DEP session is constructed on the DEP layer, or the DEP session is located at the DEP layer; and the sending module is configured to send configuration information of the DEP session to the first communication apparatus.

The sending module may be further configured to send, based on the DEP session, uplink DEP data from the second communication apparatus to the computing power (or the first application on the computing power), and/or sends downlink DEP data from the computing power (or the first application on the computing power) to the second communication apparatus.

The third layer of the radio network protocol layer may include a radio resource control (RRC) layer.

The DEP layer may be located above a media access control (MAC) layer and a physical (PHY) layer.

The receiving module may be configured to receive a first message from the first communication apparatus, where the first message is used to request to perform DEP registration for the first application; and the sending module is configured to send a DEP authentication request to a DEP control unit based on the first message, where the DEP authentication request is used to request to obtain authentication information of the first communication apparatus, and the authentication information includes information about whether the first communication apparatus is qualified to use the first application.

The receiving module may be configured to receive the configuration information of the DEP session from the DEP control unit.

The data edge protocol may include one or more of the following fields: a field indicating a DEP type, a field indicating an identifier of the DEP session, a field indicating a priority of the DEP session, a field indicating a source DEP address, a field indicating a destination DEP address, or a DEP payload.

The receiving module may be configured to receive the uplink DEP data from the first communication apparatus, where the uplink DEP data includes the identifier of the DEP session; and the processing module is further configured to establish an association between the DEP session and a radio bearer.

The uplink DEP data may further include one or more types of the following information: the priority of the DEP session, the source DEP address, or the destination DEP address.

When the downlink DEP data from the computing power (or the first application on the computing power) is sent to the first communication apparatus, the sending module may be configured to receive the downlink DEP data from the computing power (or the first application on the computing power) by using the DEP session; the processing module is configured to determine, based on the association between the DEP session and the radio bearer, a radio bearer associated with the DEP session; and the sending module may be configured to send the downlink DEP data to the first communication apparatus over the radio bearer.

The processing module may be further configured to select a created DEP session for the first communication apparatus; and obtain information about a computing power resource of the DEP session and a DEP address of the computing power based on the created DEP session, and add the information about the computing power resource of the DEP session and the DEP address of the computing power to the configuration information of the DEP session; and the sending module may be further configured to notify the computing power that a new communication apparatus (that is, the first communication apparatus) joins the DEP session.

The configuration information of the DEP session may include one or more pieces of the following information: the identifier of the DEP session, a DEP address of the computing power, computing resource information of the computing power, the priority of the DEP session, or a radio bearer of the DEP session.

The DEP session establishment request may include information about a deployment party of the first application; the processing module is configured to send an authorization request to the deployment party of the first application based on the DEP session establishment request by using the sending module, where the authorization request is used to request the deployment party of the first application to authorize the DEP session; and the receiving module is configured to receive authorization information from the deployment party of the first application, where the authorization information is used to indicate that the DEP session is allowed to be authorized.

Optionally, the authorization request carries an identifier of the first communication apparatus, and the authorization information carries the priority of the DEP session.

For beneficial effects of the fourth aspect, refer to the corresponding descriptions of the second aspect. Details are not described herein again.

According to a fifth aspect, an embodiment provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or an interface of another type, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor. When executing the instructions or the data stored in the memory, the processor may implement the method described in the first aspect.

According to a sixth aspect, an embodiment provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or an interface of another type, and the another device may be a network device. The processor is configured to invoke a group of programs, instructions, or data to perform the method described in the second aspect. The apparatus may further include a memory, configured to store the programs, the instructions, or the data invoked by the processor. The memory is coupled to the processor. When executing the instructions or the data stored in the memory, the processor may implement the method described in the second aspect.

According to a seventh aspect, an embodiment further provides a non-transitory computer-readable storage medium. The non-transitory computer-readable storage medium stores computer-readable instructions, and when the computer-readable instructions are run on a computer, the method according to the first aspect or the second aspect, is performed.

According to an eighth aspect, an embodiment provides a chip system. The chip system includes a processor, and may further include a memory, configured to implement the method in the first aspect or the second aspect. The chip system may include a chip or may include a chip and another discrete component.

According to a ninth aspect, an embodiment provides a communication system. The system includes a terminal device and a network device, the terminal device is configured to perform the method in the first aspect and the network device is configured to perform the method in the second aspect.

According to a tenth aspect, a computer program product including instructions is provided. When the computer program product is run on a computer, the method in the first aspect or the second aspect, is performed.

DETAILED DESCRIPTION OF THE EMBODIMENTS

Embodiments provide a data edge protocol (DEP)-based communication method and apparatus. The method and the apparatus are based on a same concept. Because principles for resolving a problem by using the method and the apparatus are similar, mutual reference may be made between implementations of the apparatus and the method, and repeated descriptions are omitted.

In descriptions of the embodiments, the term "and/or" describes an association relationship between associated objects and indicates that three relationships may exist. For example, A and/or B may indicate the following three cases: only A exists, both A and B exist, and only B exists. The character "/" generally indicates an "or" relationship between the associated objects. "At least one" means one or more, and "a plurality of" means two or more. In addition, it should be understood that terms such as "first" and "second" are merely used for distinguishing and description, but should not be understood as indicating or implying relative importance, or should not be understood as indicating or implying a sequence.

The following describes in detail embodiments with reference to accompanying drawings.

The communication method provided in embodiments may be applied to a 5G communication system, for example, a 5G new radio (NR) system, or may be applied to various future evolved communication systems, for example, a sixth generation (6G) communication system and a seventh generation (7G) communication system.

Figures 1, 2:
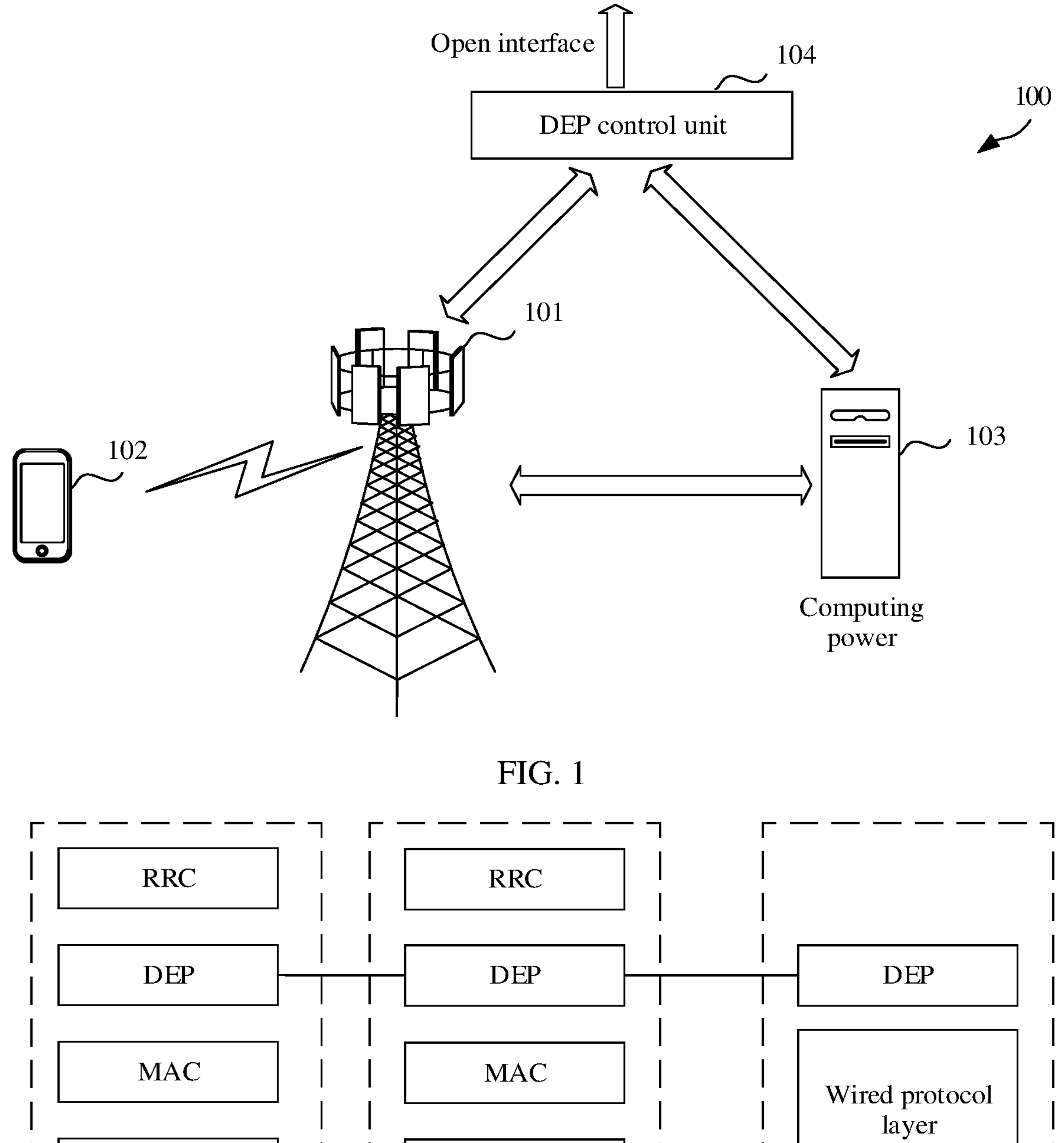
FIG. 1 is a schematic diagram of an architecture of a communication system according to an embodiment.
FIG. 2 is a schematic diagram of locations of a DEP in a protocol stack of a terminal device, a network device, and a computing power according to an embodiment.

FIG. 1 is an architecture of a communication system to which an embodiment is applicable. As shown in FIG. 1, a communication system 100 includes a network device 101 and a terminal device 102.

First, possible implementation forms and functions of the network device 101 and the terminal device 102 are described by using examples.

The network device 101 provides a service for the terminal device 102 within a coverage region of the network device 101. Refer to FIG. 1. For example, the network device 101 provides wireless access for one or more terminal devices 102 within the coverage region of the network device 101.

The network device 101 is a node in a radio access network (RAN) and may also be referred to as a base station or a RAN node (or device). Currently, some examples of the network device 101 are a next-generation NodeB (gNB), a next-generation evolved NodeB (Ng-eNB), a transmission reception point (TRP), an evolved NodeB (eNB), a radio network controller (RNC), a NodeB (NB), a base station controller (BSC), a base transceiver station (BTS), a home base station (HNB), a baseband unit (BBU), or a wireless fidelity (Wi-Fi) access point (AP). The network device 101 may alternatively be a satellite, and the satellite may also be referred to as a high-altitude platform, a high-altitude aircraft, or a satellite base station. The network device 101 may alternatively be another device that has a function of the network device. For example, the network device 101 may alternatively be a device that serves as a network device function in device to device (D2D) communication, internet of vehicles, or machine to machine (M2M). Alternatively, the network device 101 may alternatively be a network device in a possible future communication system.

The terminal device 102 is also referred to as user equipment (UE), a mobile station (MS), a mobile terminal (MT), or the like, and is a device that provides a user with voice or data connectivity. For example, the terminal device 102 is a handheld device, a vehicle-mounted device, or the like that has a wireless connection function. Currently, the terminal device 102 may be a mobile phone, a tablet computer, a notebook computer, a palmtop computer, a mobile internet device (MID), a wearable device (for example, a smartwatch, a smart band, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like. The terminal device 102 may alternatively be another device having a terminal function. For example, the terminal device 102 may alternatively be a device functioning as a terminal function in D2D communication, internet of vehicles, or M2M communication. In embodiments, the terminal device and the network device may be described as a communication apparatus. For differentiation, a first communication apparatus and a second communication apparatus may also be used for description.

The communication system 100 may further include a computing power 103.

The computing power 103 may also be referred to as a computing resource, an edge computing resource, a computing resource, or another name. The computing power 103 may include computing resources, memory resources, or storage resources of various types and forms. The computing power 103 may be a resource integrated into a terminal device, a network device, an access network, a core network, a transmission network, or a data network. The computing power 103 may also include resources in various forms that are independently deployed, for example, MEC, an edge cloud, a public cloud, an industry private cloud, or an on-premises resource, or may be a combination thereof. A physical device of the computing power 103 may be based on a general-purpose central processing unit (CPU), for example, an advanced reduced instruction processing unit (ARM) or an X86. The physical device of the computing power 103 may also be a heterogeneous computing capability based on an artificial intelligence (AI) chip, a graphics processing unit (GPU) chip, a field programmable gate array (FPGA), or the like. The computing power 103 is provided based on virtual division of computing resources in different forms and granularities. For example, the computing power 103 includes a cluster, a host, a virtual machine (VM), a container, a virtual node (POD), or another resource with a finer granularity. The resource is a resource that can run a segment of logic code or a function, for example, a cloud native serverless. The virtual node may include a group of containers, that is, include one or more containers.

In this embodiment, the computing power 103 may be deployed in a wireless network, and the wireless network may refer to a 3rd generation partnership project (3GPP) network. The wireless network may include some or all of a terminal, an access network, a core network, a transmission network, or a data network. In actual application, if the computing power 103 is deployed outside the wireless network, a direct connection may be established between the network device and the computing power. That the direct connection can be established between the network device and the computing power may mean that the network device and the computing power may communicate with each other through a wired protocol layer. A connection is established through a network layer or a protocol layer below the network layer, where the protocol layer below the network layer includes a media access control layer and/or a physical layer. In this embodiment, an application scenario in which the computing power is deployed in the wireless network is described, and the described solution may also be applied to an application scenario in which the computing power is deployed outside the wireless network.

In this embodiment, one or more applications may be deployed in the wireless network. The application deployed in the wireless network may be any type of application. Generally, the application deployed in the wireless network may have a high requirement on aspects such as real-time performance, localization, data security, or data privacy. For example, the application deployed in the wireless network may be an AI application, a perception application, an AR application, an industry control application, a holographic application, an internet of things (IoT) application, an autonomous driving application, a robot application, a smart manufacturing application, an uncrewed aerial vehicle application, or tactile internet. The perception application is an ecosystem monitoring application or a health monitoring application. The application can also be deployed outside the wireless network. In this embodiment, a scenario in which the application is deployed in the wireless network is described, and the described solution may also be applied to an application scenario in which the application is deployed outside the wireless network. In this embodiment, the application may be deployed on the computing power. The application may be software deployed on the computing power, or may be referred to as application software. When the computing power is deployed in the wireless network, the application on the computing power is deployed in the wireless network. In this embodiment, that the application performs communication including data sending or data receiving may refer to that the computing power on which the application is located performs communication, or that a hardware device running application software performs communication. The hardware device running the application software may be, for example, an application server or a chip.

The computing power 103 may be used to complete a computing task by using the computing resource, and the computing task may be requested by the terminal device 102 or requested by the application. When the computing task is executed between the terminal device 102 and an application on the computing power 103, communication needs to be performed. In this embodiment, data transmission is completed by using a computing bearer between the terminal device and the application. The computing task is a form of application running on the computing power. In embodiments, the computing task may also be briefly referred to as a task. One application can correspond to one or more tasks.

Optionally, the communication system 100 may further include a DEP control unit 104.

The DEP control unit 104 is configured to process a signaling control part of a DEP protocol, and perform functions such as DEP terminal management, DEP address management, DEP session management, and mapping management of a DEP session and a radio bearer. The DEP control unit 104 has direct control interfaces with both the network device 101 and the computing power 103. The DEP control unit 104 further supports a third-party open interface, for example, an application programming interface (API), so that an application deployment party can deploy an application on the computing power by using the open interface.

The DEP control unit 104 may be an independent functional entity or network element, or may be a logical function integrated into a network device, a terminal device, or another device in a wireless network. A physical device of the DEP control unit 104 may be a CPU, an AI chip, a GPU, or an FPGA. The DEP control unit 104 may be deployed at any other location in an access network, a core network, a wireless network operation support system (OSS), or a wireless network. The DEP control unit 104 has a management and control interface that can communicate with a network device and a computing power that are managed and controlled by the DEP control unit 104.

The following describes in detail embodiments with reference to accompanying drawings.

The method provided in embodiments may be performed by a terminal device, or may be performed by a component (for example, a processor, a chip, or a chip system) of the terminal device. The method provided in embodiments may be performed by a network device, or may be performed by a component (for example, a processor, a chip, or a chip system) of the network device. An entity for performing the method in embodiments may also be referred to as a communication apparatus. The communication apparatus may be a terminal device or a component (for example, a processor, a chip, or a chip system) of the terminal device, or the communication apparatus may be a network device or a component (for example, a processor, a chip, or a chip system) of the network device. For differentiation, a first communication apparatus and a second communication apparatus may respectively be used to represent the terminal device and the network device. The first communication apparatus corresponds to the terminal device, and the second communication apparatus corresponds to the network device. The following describes the concept of the DEP protocol.

The DEP protocol supports information exchange between the terminal device and the application on the computing power. The information exchange may include signaling exchange and data exchange. Data may be user plane data, and signaling may be control plane signaling. The terminal device and the application on the computing power can communicate with each other over the DEP protocol. Both the terminal device and the application on the computing power support the DEP protocol. In a possible implementation, the terminal device communicates with the application on the computing power by using the network device, and the terminal device, the network device, and the computing power all support the DEP protocol. Data based on the DEP protocol may be carried in a DEP session. A radio bearer may be established between the terminal device and the network device. The radio bearer can be a data radio bearer (DRB) or a signaling radio bearer (SRB). The DRB is used to carry data, and the SRB is used to carry signaling. The radio bearer in this embodiment may alternatively be a radio bearer in any form.

In a possible implementation, a location of a DEP layer in a protocol stack may be below a third layer of a wireless network protocol layer. For example, the third layer of the wireless network protocol layer may be a radio resource control (RRC) layer. The DEP layer may also be above a media access control (MAC) layer or a physical (PHY) layer. FIG. 2 shows an example of a location of the DEP in the protocol stack in the terminal device, the network device, and the computing power. The DEP session is constructed at the DEP layer, or the DEP session is located at the DEP layer.

Various types of DEP messages, DEP data, or DEP signaling described in embodiments may be completed based on the DEP protocol stack. Any DEP message is used as an example. The DEP message may be transmitted by using RRC/NAS signaling based on the DEP protocol stack. As shown in FIG. 2, the DEP message is transmitted to the DEP layer by using an RRC layer or a NAS layer. The NAS layer may be above the RRC layer. An RRC/NAS message is used as a DEP payload (payload data). If the DEP message is implemented based on the RRC/NAS, when sending the DEP message to the network device, the terminal device may select an SRB to transmit a DEP authentication request message, which is similar to another wireless RRC/NAS signaling message, instead of transmitting the DEP authentication request message by using the DRB or a radio bearer in another form.

Alternatively, the DEP message may also be transmitted by using DEP-specific signaling defined by the DEP. For example, the terminal device transmits the DEP message by using a DEP protocol layer that is equivalent to the network device, and the network device transmits the DEP message by using the DEP protocol layer corresponding to the computing power. The following describes, by using an example, a field or a DEP format that may be included in the DEP protocol.

TABLE 1

| Type | Session identifier (Session ID) | Class |
|---|---|---|
| | Source DEP ID | |
| | Destination DEP ID | |
| | DEP payload data | |

As shown in Table 1, the DEP protocol may include one or more of the following fields:

Type field: a field indicating a DEP type and a type of a DEP data packet. A value of the type field varies according to a rule. For example, the type field may be DEP registration signaling, session request signaling, or user data. The value of the type field may be 1, 2, 3, . . . , and the like. For example, a value 1 of the type field indicates that the DEP type is DEP registration signaling, a value 2 of the type field indicates that the DEP type is session request signaling, and a value 3 of the type field indicates that the DEP type is user data. The value of the type field herein is merely an example. In actual application, another value may be used to represent different types.

Session identifier (ID) field: is a field indicating an identifier of the DEP session, indicates a session on which the DEP data packet is located, and is a unique identifier of the DEP session. Different DEP sessions have different values of the session ID field.

Priority (class) field of the DEP session: may be referred to as a priority field for short, is a field indicating a class or a priority of the DEP session, and indicates a class or a priority of the DEP data packet. The DEP session carries the DEP data, and the network device may determine, based on the field, a priority of transmitting a data packet of the DEP data on an air interface. The computing power may determine, based on the field, a priority of a computing resource corresponding to the DEP session.

Source DEP identifier field: may indicate an identifier of a source DEP or an address of the source DEP, indicates a source address of the DEP data packet, and may uniquely identify a source of the DEP; when replying to a received DEP message, a DEP communication peer end (an end identified by a destination DEP address) sets a source DEP address in the DEP message to a destination DEP address of a reply message.

Destination DEP identifier field: may indicate an identifier of the destination DEP or a destination DEP address, indicates a destination address of the DEP data packet, and may uniquely identify a destination of the DEP; and when sending the DEP message, a DEP communication source end (an end identified by a source DEP address) sets an address of a destination DEP end to which the DEP message needs to be sent to a value of this field.

DEP payload (Payload Data) field: indicates payload data of the DEP protocol, which may be DEP signaling or service data to be transmitted by the DEP.

It may be understood that the fields included in the DEP protocol shown in Table 1 are merely examples. In actual application, the DEP may include more or fewer fields. Names of the foregoing fields and locations of the fields in the protocol are also examples of implementation. When this solution is applied, the DEP protocol may have different field names and field arrangement manners, or some other optional or mandatory fields may be further added to extend functions of the DEP protocol. The DEP protocol extended or transformed based on Table 1 still falls within the scope of this embodiment.

Figure 3:
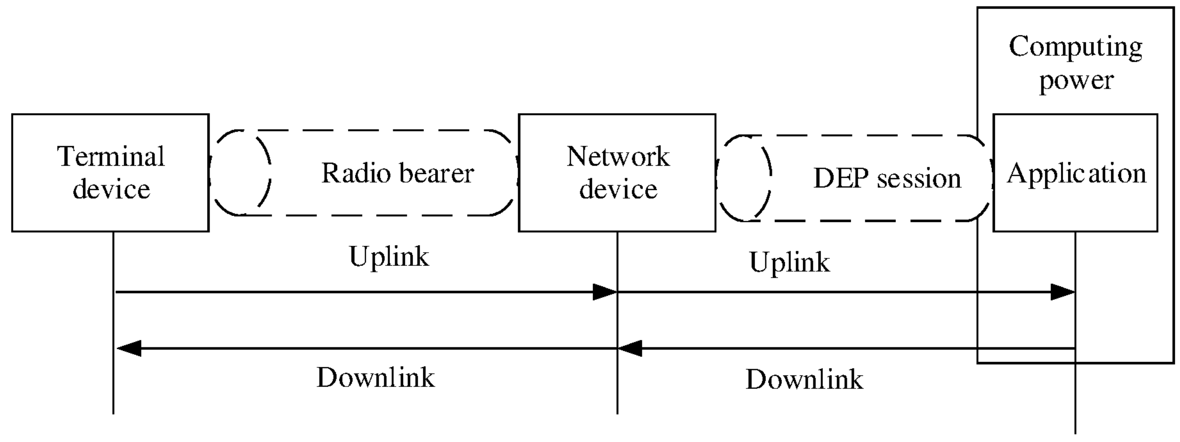
FIG. 3 is a schematic diagram of communication between a terminal device and an application on a computing power by using a network device according to an embodiment.

As shown in FIG. 3, the terminal device may communicate with the application on the computing power by using the network device. To better understand a communication manner between the terminal device and the application, for example, data sent by the terminal device to the application on the computing power may be referred to as uplink DEP data transmission, and a termination point of the uplink DEP data is at the application on the computing power; and data sent by the application on the computing power to the terminal device may be referred to as downlink DEP data transmission, and a termination point of the downlink DEP data is at the terminal device. The terminal device may perform bidirectional data transmission with one or more applications on the computing power. For uplink communication, the terminal device sends uplink DEP data to the network device over a radio bearer, and the network device receives the uplink DEP data from the terminal device over the radio bearer. The network device maps the radio bearer to the DEP session, and the network device sends the uplink DEP data to the application on the computing power by using the DEP session. For downlink communication, the application on the computing power sends downlink DEP data to the network device by using the DEP session. After receiving the downlink DEP data from the application on the computing power by using the DEP session, the network device maps the DEP session to the radio bearer. The network device sends the downlink DEP data to the terminal device over the radio bearer. The terminal device receives the downlink DEP data from the network device over the radio bearer. It may be understood that control signaling interaction between the terminal device and the application on the computing power is similar to data interaction.

Figure 4:
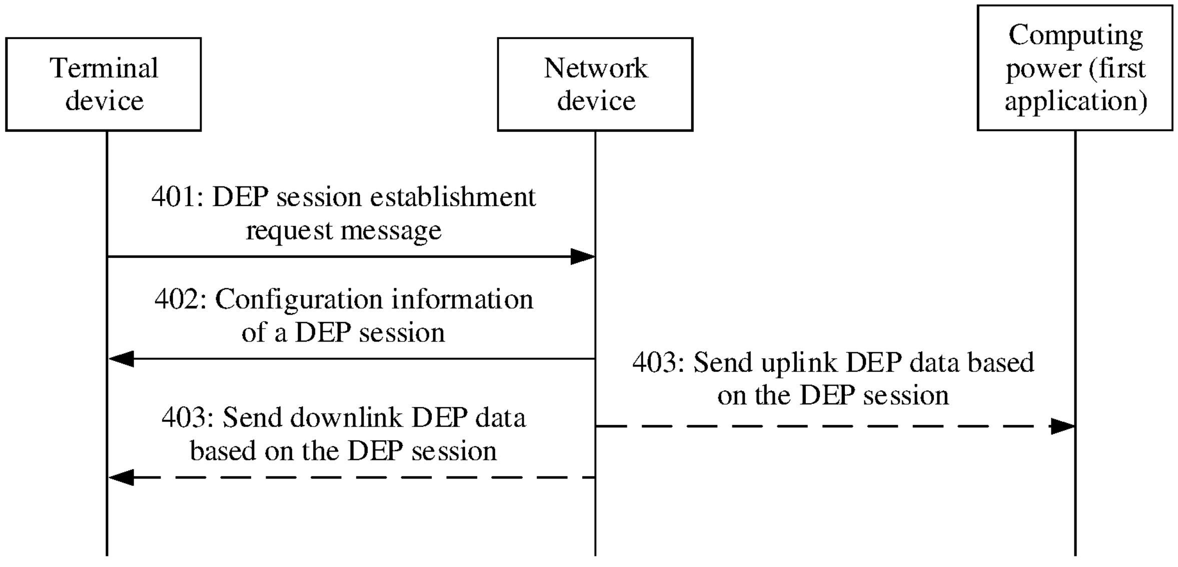
FIG. 4 is a schematic flowchart of a DEP protocol-based communication method according to an embodiment.

As shown in FIG. 4, a procedure of a DEP protocol-based communication method provided in an embodiment is described as follows. The method may be described from a perspective of an application on a terminal device, a network device, and a computing power, and from a perspective of interaction between the terminal device, the network device, and the computing power. In this embodiment, a DEP session is established between the terminal device and the computing power. The DEP session may be used to transmit data of a first application, and the DEP session between the terminal device and the computing power may also be described as a DEP session between the terminal device and the first application.

S401: The terminal device sends a DEP session establishment request message to the network device, and the network device receives the DEP session establishment request message from the terminal device.

The DEP session establishment request is used to request to establish a DEP session between the terminal device and the first application.

The first application is an application deployed on the computing power.

S402: The network device sends configuration information of the DEP session to the terminal device, and the terminal device receives the configuration information of the DEP session from the network device.

Optionally, after S402, S403 may be further included.

S403: The network device sends uplink DEP data from the terminal device to the computing power (or the first application on the computing power) based on the DEP session. The network device may further forward, to the terminal device based on the DEP session, downlink DEP data from the computing power (or the first application on the computing power).

According to the embodiment in FIG. 4, the DEP session is established between the terminal device and the network device, direct data transmission between the terminal device and the first application can be implemented by using the DEP session, and one-hop direct transmission is implemented by using the network device, thereby reducing a path for data exchange between the terminal device and the application. Therefore, compared with an existing edge computing technology, this method can further reduce a delay variation, and implement a same service while reducing network resource overheads.

The following describes possible implementations of the embodiment in FIG. 4 by using examples.

The DEP session establishment request message in S401 complies with the DEP protocol. For example, if a value of the DEP type field in the DEP session establishment request message may be 2, it indicates that the DEP type of the DEP session establishment request message is session request signaling. A payload (payload data) part in the DEP session request message may carry information used for session authentication, for example, information about an application deployment party required by the DEP session, or authentication information of the terminal device.

The configuration information of the DEP session in S402 may include one or more pieces of the following information: an identifier of the DEP session, a DEP address of a computing power on which the first application is located, computing resource information of the computing power, a priority of the DEP session, or a radio bearer of the DEP session.

After the terminal device obtains the configuration information of the DEP session, it may be considered that establishment of the DEP session is completed. Then, DEP data may be exchanged between the terminal device and the first application on the computing power based on the DEP session.

The terminal device sends the uplink DEP data to the network device over the radio bearer. After receiving the uplink DEP data from the terminal device over the radio bearer, the network device needs to map the radio bearer to the DEP session, and forward the uplink DEP data to the first application by using the DEP session.

The first application sends the downlink DEP data to the network device by using the DEP session. After receiving the downlink DEP data from the first application by using the DEP session, the network device needs to map the DEP session to the radio bearer, and forward the downlink DEP data to the terminal device over the radio bearer.

It can be understood that the network device needs to have a function of mapping the radio bearer to the DEP session. Optionally, when establishing the DEP session, the network device may establish and store an association between the radio bearer and the DEP session, or establish and store a mapping relationship between the radio bearer and the DEP session.

The following describes the mapping relationship between the radio bearer and the DEP session by using the following 1 and 2 as examples.

1. The network device may configure one or more radio bearers for the terminal device. The radio bearer may be exclusively occupied by the terminal device, and the network device establishes the radio bearer for the terminal device. When the network device establishes the plurality of radio bearers for the terminal device, the radio bearers may be associated with a specified attribute. For example, the radio bearer may be associated with QoS. Assuming that the terminal device has three different QoS requirements for calculating data communication, the network device may establish three radio bearers for the terminal device. A radio bearer 1 is associated with QoS 1, a radio bearer 2 is associated with QoS 2, and a radio bearer 3 is associated with QoS 3.

For example, the terminal device triggers V2X communication, and different types of communication services in the V2X communication correspond to different quality of service requirements. For example, a V2X communication service used for self-driving has a very high quality of service requirement, and corresponds to the QoS 1. A V2X communication service used for vehicle information collection has a lower quality of service requirement, and corresponds to the QoS 2. In this case, for the V2X communication service of the terminal device, the network device establishes the radio bearer 1 for the V2X communication service used for self-driving, and the radio bearer 1 is associated with the QoS 1; and establishes the radio bearer 2 for the V2X communication service used for vehicle information collection, and the radio bearer 2 is associated with the QoS 2.

It may be understood that the radio bearer may be further associated with another attribute, and an association manner of the another attribute is similar to the association manner of the QoS.

For example, there may be the following types of mapping relationships between the radio bearer and the DEP session.

(1) There is a one-to-one mapping relationship between the radio bearer and the DEP session.

For example, the network device establishes a radio bearer 1 for the terminal device. The terminal device triggers a computing task, the terminal device requests to establish the DEP session, and the network device establishes a DEP session 1 for the terminal device.

For an uplink direction, the terminal device generates uplink DEP data, and sends the uplink DEP data to the network device over the unique radio bearer 1, and the network device receives the uplink DEP data from the terminal device over the radio bearer 1. The network device may uniquely determine, based on the mapping relationship between the radio bearer and the DEP session, the DEP session 1 corresponding to the radio bearer 1, and send the uplink DEP data to the first application by using the DEP session 1.

For a downlink direction, the first application deployed on the computing power or a task in the first application sends downlink DEP data to the network device by using the DEP session. The network device receives the downlink DEP data from the computing power by using the DEP session 1, and may uniquely determine, based on the relationship between the DEP session and the radio bearer, the radio bearer 1 corresponding to the DEP session 1. The network device sends the downlink DEP data to the terminal device over the radio bearer 1.

(2) There is a many-to-one mapping relationship between the radio bearer and the DEP session.

Figure 5:
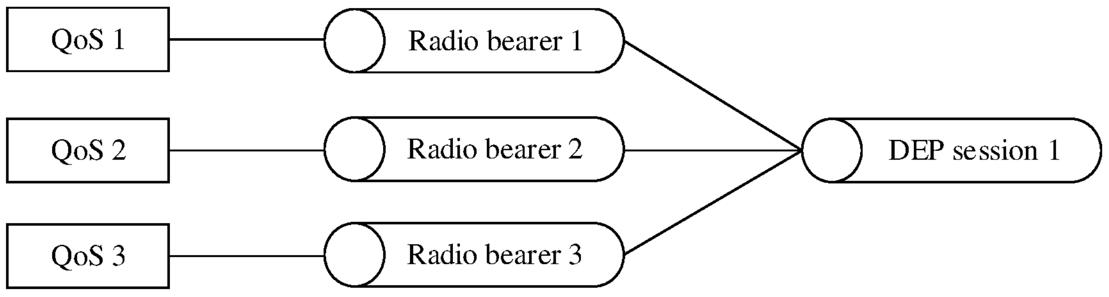
FIG. 5 is a schematic diagram 1 of a mapping relationship between a radio bearer and a DEP session according to an embodiment.

For example, as shown in FIG. 5, the network device establishes a radio bearer 1, a radio bearer 2, and a DEP session 1 for the terminal device. The radio bearer 1, the radio bearer 2, and the radio bearer 3 correspond to QoS 1, QoS 2, and QoS 3 respectively. The terminal device triggers a computing task, the terminal device requests to establish the DEP session, and the network device establishes the DEP session 1 for the terminal device.

It is assumed that the terminal device triggers three computing tasks for the first application, and the three computing tasks have different attributes. For example, the three computing tasks have different QoS requirements: the QoS 1, the QoS 2, and the QoS 3. The three computing tasks of the first application may be mapped to a single radio bearer. In other words, the DEP session 1 may separately have a mapping relationship with the radio bearer 1, the radio bearer 2, and the radio bearer 3.

For an uplink direction, the terminal device generates uplink DEP data 1, uplink DEP data 2, and uplink DEP data 3. Assuming that QoS requirements of the uplink DEP data 1 to 3 are the QoS 1 to the QoS 3 respectively, the terminal device sends the uplink DEP data 1, the uplink DEP data 2, and the uplink DEP data 3 over the radio bearer 1, the radio bearer 2, and the radio bearer 3 respectively. The network device receives the uplink DEP data 1 over the radio bearer 1, receives the uplink DEP data 2 over the radio bearer 2, and receives the uplink DEP data 3 over the radio bearer 3. If there are mapping relationships between the radio bearer 1, the radio bearer 2, and the radio bearer 3 and the DEP session 1, the network device sends the uplink DEP data 1, the uplink DEP data 2, and the uplink DEP data 3 to the first application on the computing power by using the DEP session 1.

For a downlink direction, the first application deployed on the computing power generates downlink DEP data, and sends downlink DEP data 1 to the network device by using the DEP session 1 corresponding to the first application, and the network device receives the downlink DEP data 1 from the first application by using the DEP session 1. If the network device determines that there are mapping relationships between the radio bearer 1, the radio bearer 2, and the radio bearer 3 and the DEP session 1, the network device may select, based on a QoS requirement of downlink data 1, the radio bearer 1 that meets the QoS requirement to send the downlink data 1. Optionally, the network device may allocate the downlink DEP data of the DEP session to different radio bearers according to a decision of a load sharing algorithm.

(3) There is a one-to-many mapping relationship between the radio bearer and the DEP session.

Figures 6, 7, 8, 9:
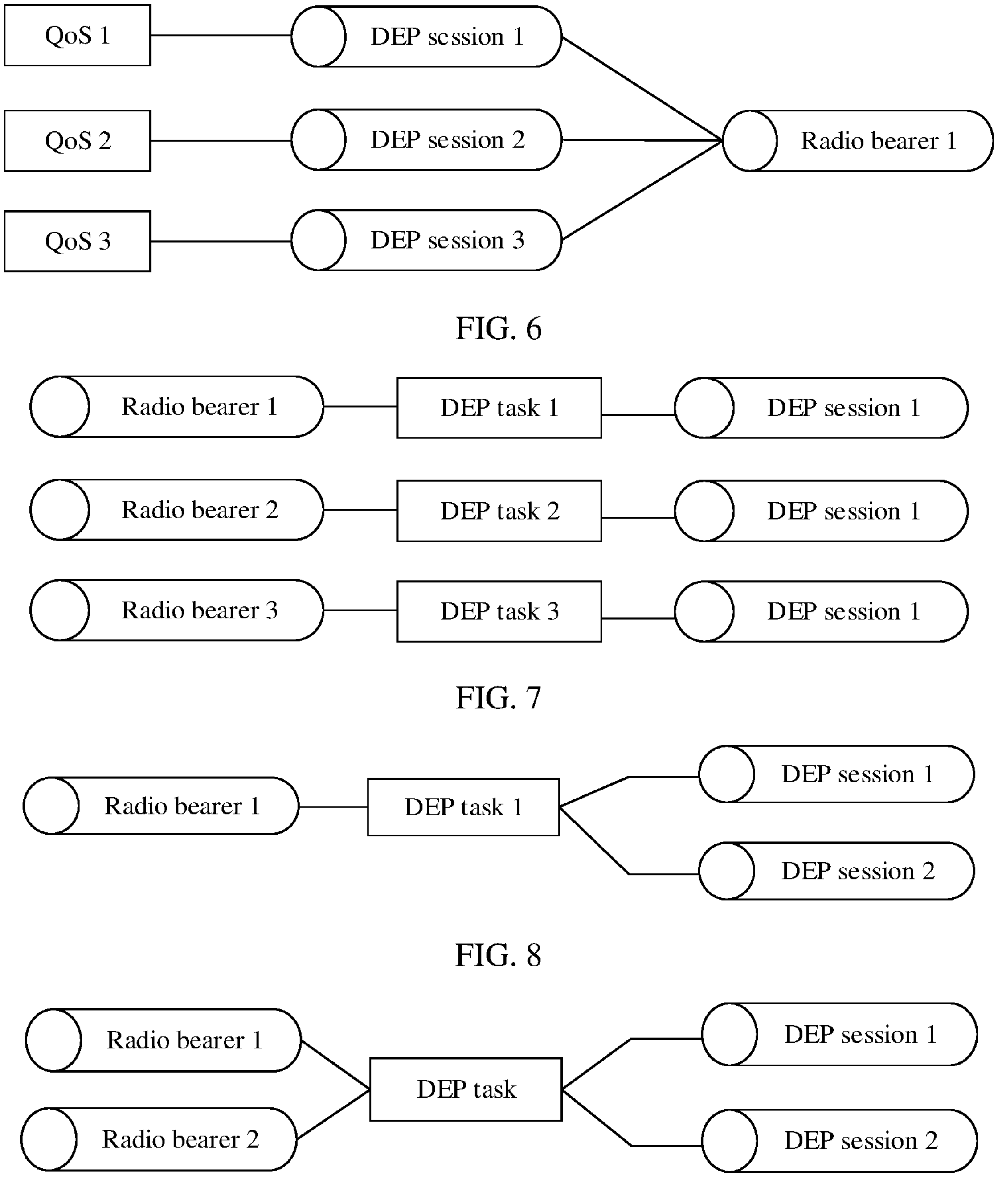
FIG. 6 is a schematic diagram 2 of a mapping relationship between a radio bearer and a DEP session according to an embodiment.
FIG. 7 is a schematic diagram 3 of a mapping relationship between a radio bearer and a DEP session according to an embodiment.
FIG. 8 is a schematic diagram 4 of a mapping relationship between a radio bearer and a DEP session according to an embodiment.
FIG. 9 is a schematic diagram 5 of a mapping relationship between a radio bearer and a DEP session according to an embodiment.

For example, as shown in FIG. 6, the terminal device triggers a computing task, and the terminal device requests to establish the DEP session. The network device may establish a plurality of DEP sessions for the terminal device, for example, establish a DEP session 1, a DEP session 2, and a DEP session 3. The network device establishes a radio bearer 1 for the terminal device. The radio bearer 1 separately has a mapping relationship with the DEP session 1, the DEP session 2, and the DEP session 3.

The plurality of DEP sessions may be distinguished by different configurations, for example, different QoS configurations enable different DEP sessions to present different capabilities. DEP sessions with different features are selected for data packets with different QoS requirements in radio bearers. The DEP session 1, the DEP session 2, and the DEP session 3 may be associated with different attributes respectively. For example, the DEP session 1, the DEP session 2, and the DEP session 3 correspond to QoS 1, QoS 2, and QoS 3 respectively.

For uplink direction, the terminal device sends uplink DEP data to the network device over the radio bearer 1, and the network device receives the uplink DEP data from the terminal device over the radio bearer 1. The network device determines, based on the mapping relationship, that the radio bearer 1 separately has a mapping relationship with the DEP session 1, the DEP session 2, and the DEP session 3. In this case, the network device may select, based on the QoS requirement of the uplink DEP data, a DEP session that meets the QoS requirement to send the uplink DEP data. Optionally, the network device may allocate the uplink DEP data to different DEP sessions according to a decision of a load sharing algorithm.

For a downlink direction, the first application deployed on the computing power generates downlink DEP data, and sends downlink DEP data 1 to the network device by using a DEP session 1 corresponding to the first application. The network device receives the downlink DEP data 1 from the first application by using the DEP session 1. The network device determines that there is a mapping relationship between the DEP session 1 and the radio bearer 1, and the network device selects to map the DEP session 1 to the radio bearer 1, and sends downlink data over the radio bearer 1.

For example, when downlink DEP data is generated for a task 1, a DEP session for sending the downlink DEP data may be selected based on an attribute of the DEP session. For example, the DEP session is selected based on QoS corresponding to a quality of service requirement. A DEP session that meets the QoS requirement may be selected based on the QoS requirement for the downlink DEP data generated by the first application, to send the downlink DEP data. After receiving the downlink DEP data of the task 1 on the computing power by using the DEP session, the network device may uniquely correspond to the radio bearer 1 based on the mapping relationship, and send the downlink DEP data over the radio bearer 1.

2. The network device establishes a radio bearer for the DEP task, and one DEP task corresponds to one radio bearer. The DEP task may relate to one or more terminal devices. When the DEP task relates to the plurality of terminal devices, the terminal devices share the radio bearer.

Based on different DEP tasks, one or more radio bearers of a DEP granularity may coexist in one network device, and each radio bearer may be associated with an attribute. For example, a QoS policy configured for each radio bearer may vary. In this scenario, when the network device processes uplink and downlink DEP data, the network device needs to map session information in the DEP session to a terminal device. The session information includes a session identifier explicitly indicated in the DEP session, or information that is formed based on various protocol fields and that can be used for the session identifier, for example, a DEP destination address or a DEP source address. Similar to the terminal device granularity described in (1), if there are the plurality of radio bearers that can be selected, one of the plurality of radio bearers may be selected based on different features or load balancing algorithms of the plurality of radio bearers to carry the DEP data packet.

For example, there may be the following types of the mapping relationships between the radio bearer and the DEP session.

(1) There is a one-to-many mapping relationship between the radio bearer and the DEP session.

For example, as shown in FIG. 7, a radio bearer 1 and a DEP session 1 may be established for a DEP task 1, and there is a correspondence between the radio bearer 1 and the DEP session 1. A radio bearer 2 and a DEP session 2 are established for a DEP task 2, and there is a correspondence between the radio bearer 2 and the DEP session 2. A radio bearer 3 and a DEP session 3 are established for a DEP task 3, and there is a correspondence between the radio bearer 3 and the DEP session 3.

For an uplink direction, the terminal device generates uplink DEP data of the DEP task 1, and sends the uplink DEP data to the network device over the radio bearer 1 corresponding to the DEP task 1, and the network device receives the uplink DEP data from the terminal device over the radio bearer 1. The network device may uniquely determine, based on the mapping relationship between the radio bearer and the DEP session, the DEP session 1 corresponding to the radio bearer 1, and send the uplink DEP data to the first application on the computing power by using the DEP session 1.

For a downlink direction, the first application deployed on the computing power or a task in the first application sends downlink DEP data to the network device by using the DEP session 1. The network device receives the downlink DEP data from the computing power by using the DEP session 1, and may uniquely determine, based on the relationship between the DEP session and the radio bearer, the radio bearer 1 corresponding to the DEP session 1. The network device sends the downlink DEP data to the terminal device over the radio bearer 1.

(2) There is a one-to-many mapping relationship between the radio bearer and the DEP session.

For example, as shown in FIG. 8, the network device establishes a radio bearer 1 for a DEP task 1, and establishes a DEP session 1 and a DEP session 2 for the DEP task 1. In this case, the radio bearer 1 has a mapping relationship with both the DEP session 1 and the DEP session 2.

For an uplink direction, the terminal device generates uplink DEP data of the DEP task 1, and sends the uplink DEP data to the network device over the radio bearer 1 corresponding to the DEP task 1, and the network device receives the uplink DEP data from the terminal device over the radio bearer 1. The network device determines, based on the mapping relationship between the radio bearer and the DEP session, that the radio bearer 1 has a mapping relationship with both the DEP session 1 and the DEP session 2, and the network device may further select a DEP session from the DEP session 1 and the DEP session 2. For example, the network device may perform selection based on an attribute of the DEP session 1 and an attribute of the DEP session 2. For example, the DEP session 1 corresponds to QoS 1, and the DEP session 2 corresponds to QoS 2. The network device may select, based on a quality of service requirement of the uplink DEP data, QoS corresponding to the quality of service requirement, and further select a DEP session corresponding to the QoS. It is assumed that the DEP session 1 corresponding to the QoS 1 is selected, and the network device sends the uplink DEP data to the first application on the computing power by using the DEP session 1.

For a downlink direction, the first application deployed on the computing power or a task in the first application sends downlink DEP data to the network device by using the DEP session 1. If the first application corresponds to a plurality of DEP sessions, selection may further be performed based on attributes of the plurality of DEP sessions corresponding to the first application, for example, a DEP session is selected based on QoS corresponding to a quality of service requirement. After receiving, by using the DEP session 1, the downlink DEP data sent by the first application on the computing power, the network device may uniquely correspond to the radio bearer 1 based on the mapping relationship. The network device sends the downlink DEP data to the terminal device over the radio bearer 1. If downlink DEP data is generated in the task 1, the downlink DEP data may be sent to the network device by using the DEP session 1 or the DEP session 2. A bearer for sending the downlink DEP data may be selected based on an attribute of the DEP session 1 and an attribute of the DEP session 2. For example, the DEP session is selected based on the QoS corresponding to the quality of service requirement. After receiving the downlink DEP data of the task 1 on the computing power by using the DEP session 1 or the DEP session 2, the network device may uniquely correspond to the radio bearer 1 based on the mapping relationship. The network device sends the downlink DEP data to the terminal device over the radio bearer 1.

(3) There is a many-to-many mapping relationship between the radio bearer and the DEP session.

One radio bearer can be mapped to a plurality of DEP sessions, and one DEP session can be mapped to a plurality of radio bearers.

For example, as shown in FIG. 9, a DEP session 1 and a DEP session 2 are established for a DEP task, and a radio bearer 1 and a radio bearer 2 are established for the DEP task. In this case, the radio bearer 1 may have a mapping relationship with both the DEP session 1 and the DEP session 2. The radio bearer 2 may have a mapping relationship with both the DEP session 1 and the DEP session 2. The DEP session 1 may have a mapping relationship with both the radio bearer 1 and the radio bearer 2. The DEP session 2 may have a mapping relationship with both the radio bearer 1 and the radio bearer 2.

For an uplink direction, the terminal device generates uplink DEP data, and sends uplink DEP data 1 to the network device over the radio bearer 1 (or the radio bearer 2) corresponding to the DEP task, and the network device receives the uplink DEP data 1 from the terminal device over the radio bearer 1 (or the radio bearer 2). The network device determines, based on the mapping relationship between the radio bearer and the DEP session, that the radio bearer 1 (or the radio bearer 2) has a mapping relationship with both the DEP session 1 and the DEP session 2, and the network device may further select a DEP session from the DEP session 1 and the DEP session 2. For a method for selecting the DEP session, refer to the description in the foregoing paragraph. It is assumed that the DEP session 1 is selected, and the network device sends the uplink DEP data to the first application on the computing power by using the DEP session 1.

For a downlink direction, the first application deployed on the computing power generates downlink DEP data, and sends downlink DEP data 1 to the network device by using a DEP session 1 (or a DEP session 2) corresponding to the first application. The network device receives the downlink DEP data 1 from the first application by using the DEP session 1 (or the DEP session 2). The network device determines that the DEP session 1 (or the DEP session 2) has a mapping relationship with both the radio bearer 1 and the radio bearer 2. In this case, the network device may select, based on an attribute of the radio bearer 1 and an attribute of the radio bearer 2, a bearer for sending the downlink DEP data 1. For example, if the network device determines that a quality of service requirement of the downlink DEP data 1 corresponds to QoS 1, and the radio bearer 1 corresponds to the QoS 1, the network device selects to map the DEP session 1 to the radio bearer 1, and sends the downlink DEP data 1 over the radio bearer 1.

It should be noted that, in this embodiment, in addition to the network device, the terminal device may record the mapping relationship in addition to the computing power or the application on the computing power. In addition, when generated data needs to be sent, received, or forwarded, the data is sent by using a corresponding radio bearer or a corresponding DEP session based on the recorded mapping relationship.

It should be additionally noted that, when the mapping relationship between the radio bearer and the DEP session is one-to-many or many-to-one, the radio bearer for transmitting data is selected from the plurality of radio bearers based on an attribute associated with the radio bearer. Similarly, the DEP session for transmitting data is selected from the plurality of DEP sessions based on an attribute associated with the DEP session. In another possible implementation, the network device, the terminal device, or the computing power may allocate the data to the radio bearer or the DEP session according to the load sharing algorithm.

Figure 10:
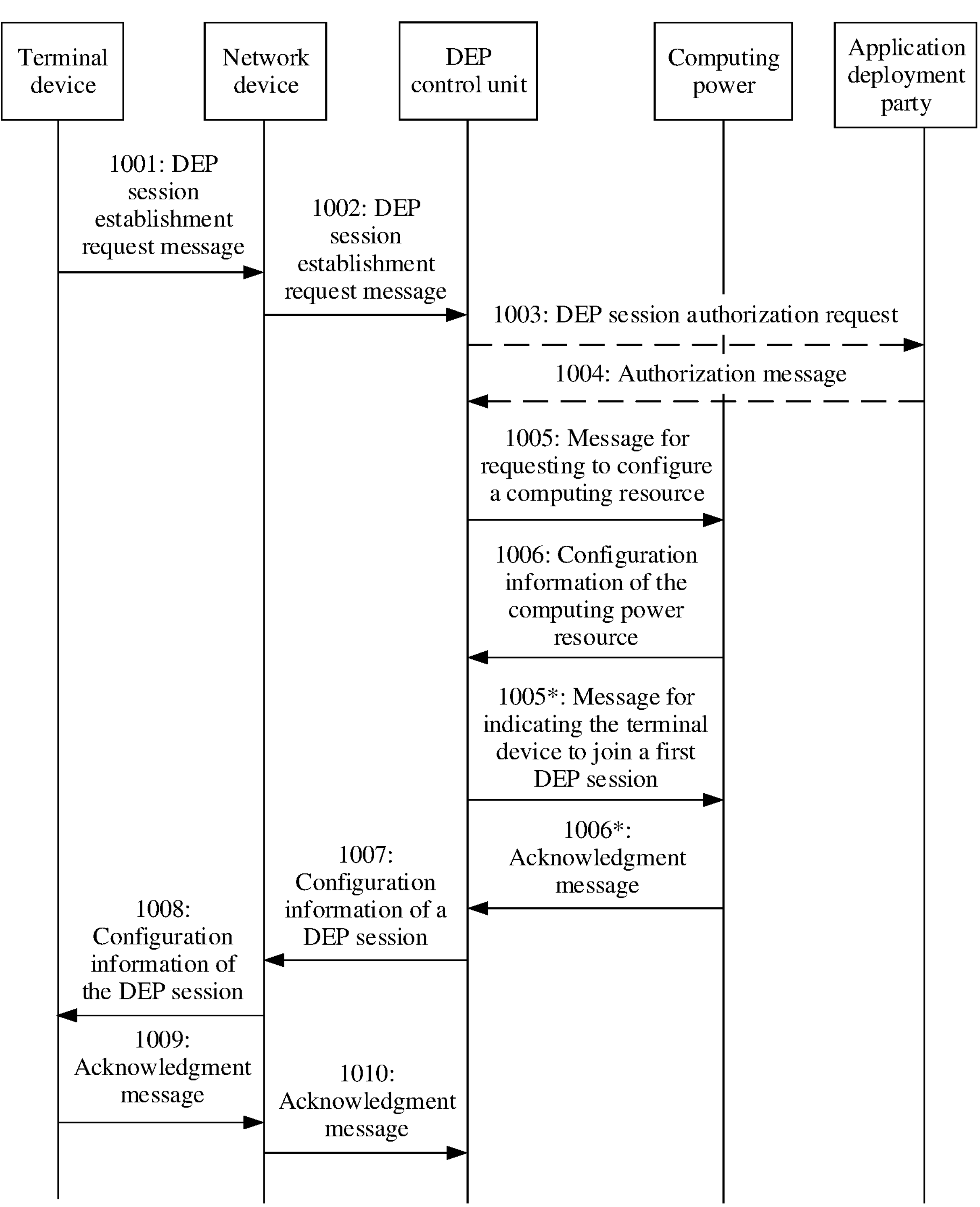
FIG. 10 is a schematic diagram of a DEP session establishment procedure according to an embodiment.

Based on the embodiment in FIG. 4, as shown in FIG. 10, with reference to an application scenario, the following further describes in detail a DEP protocol-based communication method provided in this embodiment. This embodiment may be a DEP session establishment procedure. According to this embodiment, a DEP session between a terminal device and a first application on a computing power can be established.

S1001: The terminal device sends a DEP session establishment request message to a network device, and the network device receives the DEP session establishment request message from the terminal device.

This step may correspond to S401 in the embodiment in FIG. 4.

S1002: The network device sends the DEP session establishment request message to a DEP control unit. The DEP control unit receives the DEP session establishment request message from the network device.

S1003: The DEP control unit sends a DEP session authorization request to an application deployment party, and the application deployment party receives the DEP session authorization request from the DEP control unit.

After receiving the DEP session establishment request message from the network device, the DEP control unit confirms policy configuration, and if the DEP session establishment request requires authorization, initiates the DEP session authorization request to the application deployment party based on information about the application deployment party and/or authentication information of the terminal device in the DEP session establishment request message. The DEP session authorization request carries information about a terminal device that needs to be authenticated, that is, carries information about a terminal device that initiates the DEP session.

S1004: The application deployment party returns an authorization message to the DEP control unit, and the DEP control unit receives the authorization message from the application deployment party.

After receiving the DEP session authorization request from the DEP control unit, the application deployment party may perform DEP session authorization authentication on the terminal device based on the information of the terminal device in the DEP session authorization request, and after the authorization authentication, return the authorization message to the DEP control unit, where the authorization message may include priority information of an authorized DEP session.

S1003 and S1004 are optional steps in the DEP establishment process.

The following DEP control unit creates a new DEP session based on the DEP session establishment request message and performs S1005 and S1006. S1007 is performed after S1006. Alternatively, the DEP control unit matches, based on the DEP session establishment request message, a DEP session suitable for the terminal device from existing DEP sessions, for example, matches a DEP session 1 suitable for the terminal device, and performs S1005* and S1006*. S1007 is performed after S1006.

S1005: The DEP control unit sends a message for requesting to configure a computing power resource to the computing power, and the computing power receives the message for requesting to configure the computing power resource from the DEP control unit.

The DEP control unit establishes a new DEP session based on the DEP session establishment request message received from the network device.

After receiving the request for configuring the computing power resource from the DEP control unit, the computing power resource is configured. The computing power resource may be configured in any manner, and the computing power resource may be allocated in different manners and granularities based on different forms of the computing power.

S1006: The computing power returns configuration information of the computing power resource to the DEP control unit, and the DEP control unit receives the configuration information of the computing power resource from the computing power.

S1005*: The DEP control unit may send, to the computing power, a message for indicating the terminal device to join the first DEP session.

S1006*: After receiving, from the DEP control unit, the message for indicating the terminal device to join the first DEP session, the computing power returns an acknowledgment message to the DEP control unit, and the DEP control unit receives the acknowledgment message from the computing power.

S1007: The DEP control unit sends configuration information of the DEP session to the network device, and the network device receives the configuration information of the DEP session from the DEP control unit.

The configuration information of the DEP session may include one or more pieces of the following information: an identifier of the DEP session, a DEP address of a computing power on which the first application is located, computing resource information of the computing power, a priority of the DEP session, or a radio bearer of the DEP session.

S1008: The network device sends configuration information of the DEP session to the terminal device, and the terminal device receives the configuration information of the DEP session from the network device.

In this step, the network device may send, to the terminal device, the configuration information of the DEP session received from the DEP control unit.

This step may correspond to S402 in the embodiment in FIG. 4.

The identifier of the DEP session is used to uniquely identify the DEP session. For the newly created DEP session, the identifier of the DEP session may be generated by the DEP control unit, to ensure that the identifier of the DEP session is different from another identifier of the DEP session. The DEP control unit sends the identifier of the DEP session to the network device, and the network device sends the identifier of the DEP session to the terminal device. The DEP address of the computing power on which the first application is located may be used as a destination DEP address when the terminal device generates uplink DEP data, or may be used by the terminal device to determine whether a source DEP address is the DEP address of the computing power on which the first application is located when the terminal device receives downlink DEP data. The computing power resource information of the computing power is returned from the computing power to the DEP control unit, and the computing power resource information of the computing power may include a DEP address of the computing power resource. The priority of the DEP session is priority information that is authorized for the DEP session after third-party authentication. The priority of the DEP session relates to a priority sequence of resources used by the DEP session. The resources used by the DEP session include a radio resource, a computing resource, and the like. The priority of the DEP session is explicitly indicated in the DEP session, and is provided for use by the network device and the computing power. If the third party and the DEP control unit do not explicitly provide the priority of the DEP session, a default priority may be filled in the DEP session.

S1009: The terminal device returns an acknowledgment message to the network device, and the network device receives the acknowledgment message from the terminal device.

The acknowledgment message indicates that the configuration information of the DEP session is successfully received, or the acknowledgment message indicates that establishment of the DEP session is completed.

S1010: The network device returns an acknowledgment message to the DEP control unit, and the DEP control unit receives the acknowledgment message from the network device.

The acknowledgment message indicates that the configuration information of the DEP session is successfully received, or the acknowledgment message indicates that establishment of the DEP session is completed.

After the DEP session is established, the terminal device may perform DEP protocol-based data exchange with the application on the computing power.

In the embodiment in FIG. 10, except the steps corresponding to the embodiment in FIG. 4, some or all of the remaining steps are optional steps, and are further optional implementations based on the embodiment in FIG. 4.

S403 in the embodiment in FIG. 4 describes a procedure in which the network device forwards the uplink DEP data and/or forwards the downlink DEP data. The following describes, by using FIG. 11, a DEP protocol-based data transmission method according to an embodiment. This embodiment may be combined with the foregoing DEP session establishment procedure, for example, performed after the DEP session is established, or may independently form a solution in the embodiments.

S1101: The terminal device sends uplink DEP data to the network device, and the network device receives the uplink DEP data from the terminal device.

Optionally, based on the example in Table 1, if a value of the type field included in the uplink DEP data may be 3, it indicates that the type of the uplink DEP data is user data. The session identifier field in the uplink DEP data may be an identifier of the DEP session already obtained by the terminal device. For example, with reference to the foregoing DEP session establishment procedure, if the terminal device has obtained the configuration information of the DEP session from the network device, and the configuration information of the DEP session includes the identifier of the DEP session, the session identifier field in the uplink DEP data may be filled with the identifier of the DEP session included in the configuration information of the DEP session.

The session priority field in the uplink DEP data message may indicate a priority of the DEP session already obtained by the terminal device. With reference to the foregoing DEP session establishment procedure, if the terminal device has obtained the configuration information of the DEP session from the network device, and the configuration information of the DEP session includes the priority of the DEP session, the session priority field in the uplink DEP data message may be filled with the priority of the DEP session carried in the configuration information of the DEP session. If no priority of the DEP session is configured on the network device, the terminal device performs configuration based on a local policy, or fills in a default priority.

The source DEP identifier field in the uplink DEP data message may indicate a source DEP address already obtained by the terminal device. The destination DEP identifier field in the uplink DEP data message may indicate a computing resource address already obtained by the terminal device. With reference to the foregoing DEP session establishment procedure, if the terminal device has obtained the configuration information of the DEP session from the network device, and the configuration information of the DEP session includes the source DEP address and the computing power resource address. The source DEP identifier field and the destination DEP identifier field in the uplink DEP data message may be filled with corresponding information carried in the configuration information of the DEP session.

S1102: The network device sends the uplink DEP data to a first application on a computing power. The first application on the computing power receives the uplink DEP data from the network device.

The uplink DEP data may include an identifier of a DEP session, a source DEP address, and a destination DEP address. The source DEP address is a DEP address of the terminal device, and the destination DEP address is a DEP address of the computing power on which the first application is located.

Optionally, after receiving the uplink DEP data from the terminal device, the network device may determine a priority of the DEP session based on the priority field of the DEP session, schedule the uplink DEP data based on the priority of the DEP session, and send, based on the session identifier and the destination DEP identifier in the uplink DEP data, the uplink DEP data to a computing power corresponding to the destination DEP identifier.

After the first application on the computing power receives the uplink DEP data from the network device, if the uplink DEP data includes the priority of the DEP session, the computing power may map the priority of the DEP session to a priority of a computing resource. That is, the priority of the computing power resource is determined based on the priority of the DEP session. The mapping policy may be configured based on the DEP control unit, configured based on the network device, or defined based on a standard.

In S1101 and S1102, transmission of the uplink DEP data is completed.

S1103: The first application on the computing power sends the downlink DEP data to the network device, and the network device receives the downlink DEP data from the first application.

Optionally, based on the example in Table 1, if a value of the type field included in the downlink DEP data may be 3, it indicates that the type of the uplink DEP data is user data. The downlink DEP data may further include an identifier of a DEP session. The downlink DEP data may further include a priority field, and the priority field is determined based on the uplink DEP data received from the terminal device, or the priority field is determined based on a local policy. A source DEP identifier of the downlink DEP data is a DEP address of the computing power, and a destination DEP identifier is a DEP address of the terminal device.

S1104: The network device sends the downlink DEP data to the terminal device, and the terminal device receives the downlink DEP data from the network device.

In S1103 and S1104, transmission of the downlink DEP data is completed.

Transmission of the uplink DEP data and transmission of the downlink DEP data may coexist, or may exist independently. For example, only uplink transmission or only downlink transmission exists.

Figures 11, 12:
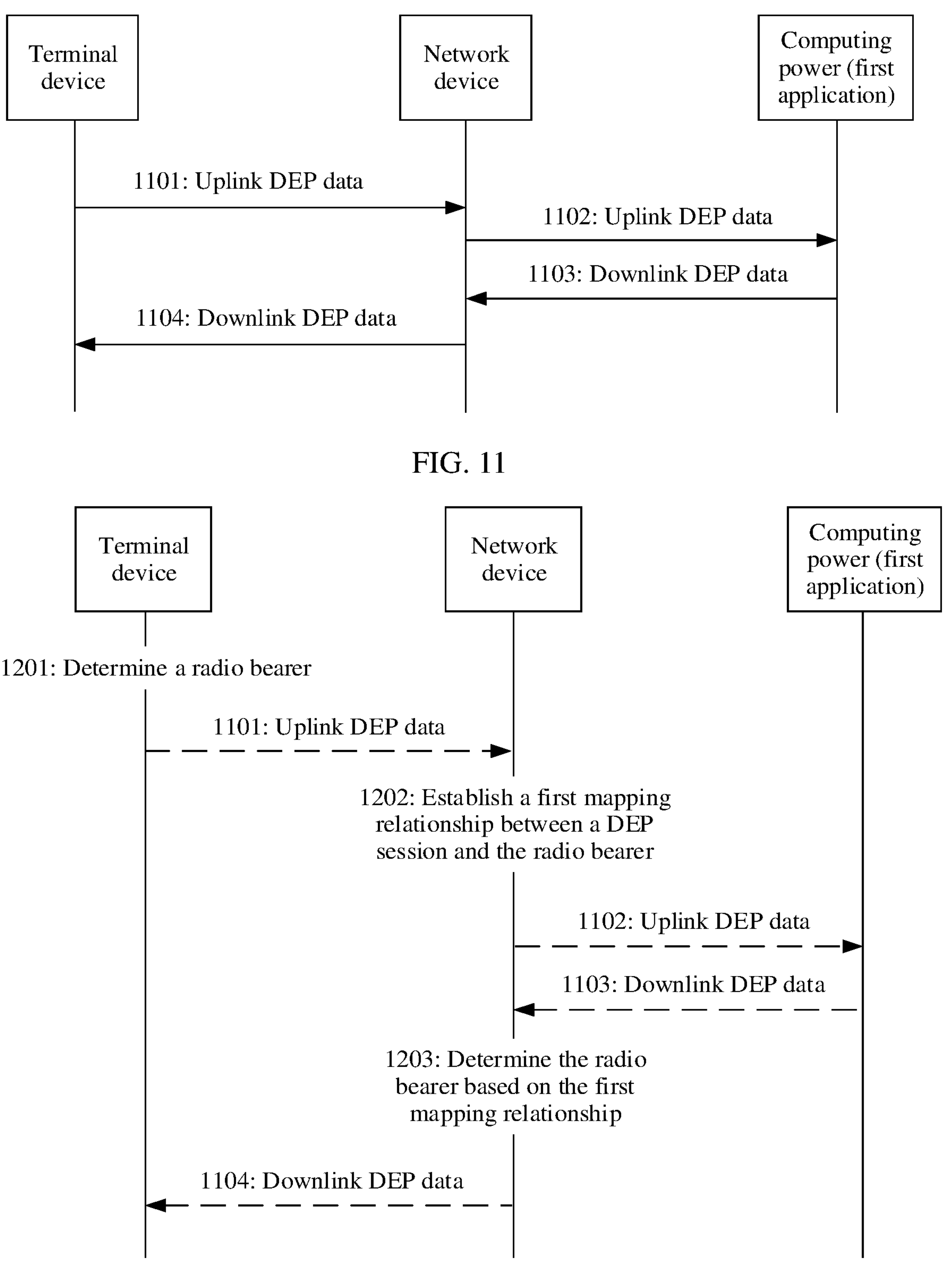
FIG. 11 is a schematic diagram of a DEP protocol-based data transmission method according to an embodiment.
FIG. 12 is a schematic flowchart of mapping and forwarding DEP data by a network device according to an embodiment.

The embodiment in FIG. 11 describes the transmission of the uplink DEP data and the transmission of the downlink DEP data. The network device needs to have a function of forwarding DEP data. When forwarding the DEP data, the network device needs to map the radio bearer to the DEP session, map the uplink the DEP data from the terminal device to the DEP session, and send the DEP data to the computing power; and map the downlink DEP data from the first application on the computing power to the radio bearer, and send the downlink DEP data to the terminal device. The following describes in detail, by using FIG. 12, an embodiment in which the network device maps and forwards the DEP data. According to the embodiment in FIG. 12, DEP data transmission between the terminal device and the first application on the computing power can be implemented based on the DEP protocol. The method provided in the embodiment of FIG. 12 may be performed after the DEP session is established with reference to the foregoing DEP session establishment procedure, or may independently form the solution in the embodiments. The method provided in the embodiment of FIG. 12 may also be performed with reference to the method for transmitting the uplink and downlink DEP data in the embodiment of FIG. 11. The following describes this embodiment with reference to steps in the embodiment in FIG. 11.

S1201: The terminal device determines a radio bearer.

When generating uplink DEP data, the terminal device needs to select a proper radio bearer to transmit the uplink DEP data. In a possible case, the network device has sent configuration information of the radio bearer corresponding to the DEP session to the terminal device, and the terminal device may determine the radio bearer based on the configuration information of the network device. In another possible case, the network device does not send configuration information of the radio bearer to the terminal device. In this case, the terminal device needs to determine whether the uplink DEP data is sent based on an existing radio bearer, or a new radio bearer needs to be created to send the uplink DEP data. If the new radio bearer is required to send the uplink DEP data, the terminal device may create the new radio bearer over a radio bearer creation procedure specified in a wireless network standard protocol, and after the new radio bearer is created, send the uplink DEP data based on the newly created radio bearer.

After determining the radio bearer, the terminal device may perform S1101. The terminal device may send the uplink DEP data to the network device over the radio bearer, and the network device receives the uplink DEP data from the terminal device over the radio bearer.

Optionally, before transmitting the uplink DEP data, the terminal device may send a priority of the DEP session to the network device. The network device determines, based on the received priority of the DEP session, a priority of transmitting a data packet of the uplink DEP data on an air interface, and configures a transmission resource based on the priority of transmitting the data packet of the uplink DEP data on the air interface. For example, before transmitting the uplink DEP data, the terminal may send a scheduling request (SR) to the network device, where the SR carries the priority of the DEP session. After receiving the SR, the network device determines the priority of the air interface transmission based on the priority of the DEP session carried in the SR and allocates a transmission resource to the terminal device based on the priority of the air interface transmission.

A policy of determining the priority of the air interface transmission based on the priority of the DEP session may be based on a configuration of the DEP control unit, based on a configuration of the network device, or based on a standard.

S1202: After receiving the uplink DEP data from the terminal device, the network device establishes a first mapping relationship between a DEP session and the radio bearer.

If the network device has configured the radio bearer for the DEP session in the DEP session establishment procedure, that is, a second mapping relationship between the DEP session and the radio bearer has been established, for example, the configuration information of the DEP session sent by the network device to the terminal device includes the radio bearer of the DEP session, the network device may determine whether the first mapping relationship is consistent with the second mapping relationship. If the first mapping relationship is consistent with the second mapping relationship, the uplink DEP data is processed. If the first mapping relationship is inconsistent with the second mapping relationship, a reset message may be sent to the terminal device based on the policy configuration, to require the terminal device to correctly send the uplink DEP data based on the previously configured radio bearer (that is, the second mapping relationship), or create a new correspondence between the DEP session and the radio bearer, and perform the uplink DEP data processing in a next step.

After the first mapping relationship between the DEP session and the radio bearer is created, S1102 and S1103 may be performed.

S1203: After receiving the downlink DEP data of the first application from the computing power, the network device determines the radio bearer based on the previously established first mapping relationship between the DEP session and the radio bearer.

After the radio bearer is determined, S1104 is performed.

The network device may determine, based on the destination DEP identifier included in the downlink DEP data, a terminal device to which the downlink DEP data needs to be forwarded, and send the downlink DEP data to the terminal device.

Figure 13:
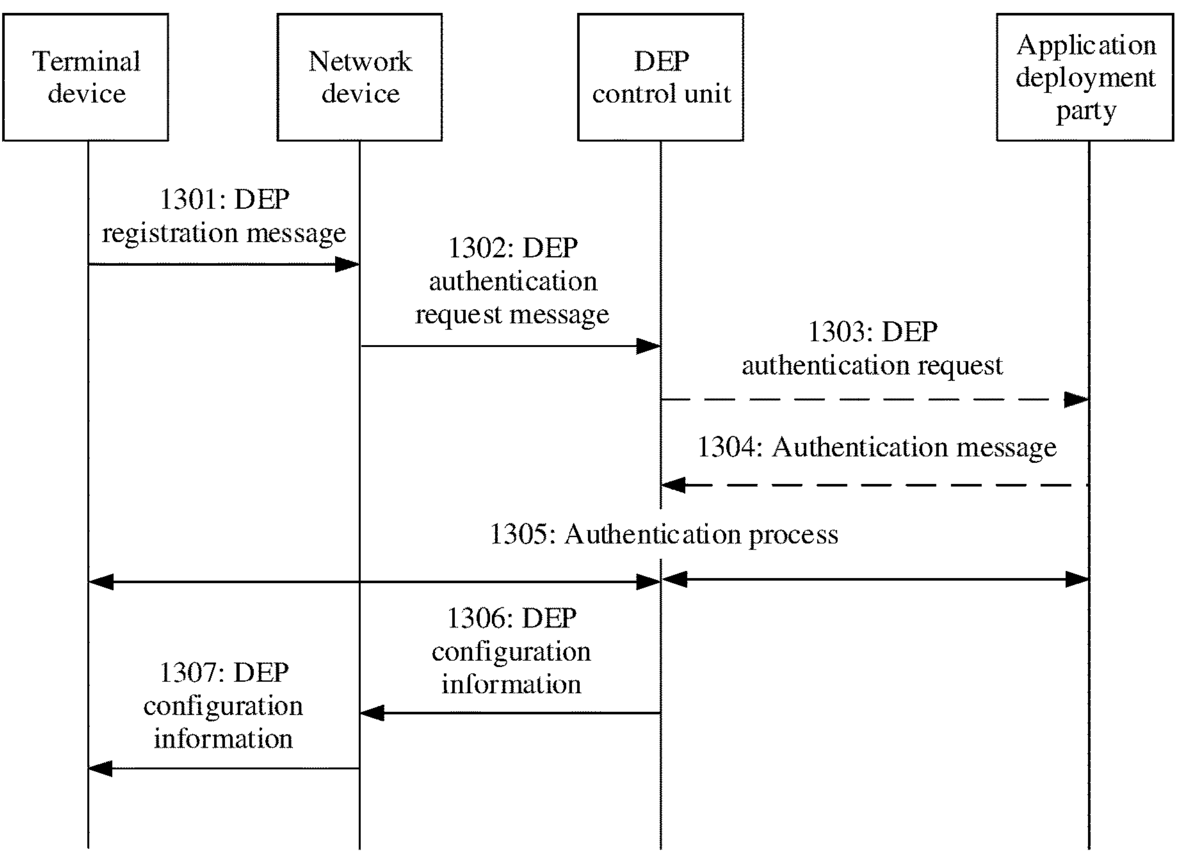
FIG. 13 is a schematic diagram of a DEP registration procedure according to an embodiment.

Based on the foregoing descriptions, the following further describes, in detail by using FIG. 13, a DEP-based communication method provided in an embodiment. This embodiment may be an embodiment of DEP registration and address allocation. According to this embodiment, the DEP registration and the DEP address allocation can be performed on the terminal device. This embodiment may be used as a further optional implementation of the foregoing DEP-based communication method. This embodiment may be combined with the foregoing DEP session establishment procedure, for example, performed before the DEP session is established, or may independently form a solution.

After the application deployment party deploys the first application on the computing power, the terminal needs to be authorized by the application deployment party to access and use the first application. The method is described as follows.

S1301: The terminal device sends a DEP registration message to the network device. The network device receives the DEP registration message from the terminal device.

Optionally, based on the example in Table 1, if a value of the type field included in the DEP registration message may be 1, it indicates that the type of the DEP registration message is DEP registration signaling.

S1302: The network device returns a DEP acknowledgment request message to the DEP control unit, and the DEP control unit receives the DEP acknowledgment request message from the network device.

The DEP authentication request message may carry information about the application deployer and/or authentication information of the terminal device.

The DEP authentication request message may be transmitted by using DEP-based RRC/NAS signaling. As shown in FIG. 2, the DEP authentication request message is transmitted to the DEP layer by using an RRC layer or a NAS layer. The NAS layer may be above the RRC layer. An RRC/NAS message is used as a DEP payload (payload data). If the DEP authentication request message is implemented based on the RRC/NAS, when sending the DEP authentication request message to the network device, the terminal device may select an SRB to transmit the DEP authentication request message, which is similar to another wireless RRC/NAS signaling message, instead of transmitting the DEP authentication request message by using the DRB or a radio bearer in another form.

Alternatively, the DEP authentication request message may also be transmitted by using DEP-specific signaling defined by the DEP.

S1303: The DEP control unit sends a DEP authentication request to the application deployment party, and the application deployment party receives the DEP authentication request from the DEP control unit.

The DEP control unit determines, based on the information about the application deployer and/or the authentication information of the terminal device carried in the DEP authentication request received in S1302, whether it is necessary to initiate the authentication request to the application deployer. If necessary, the DEP control unit sends the DEP authentication request to the application deployment party. The DEP authentication request carries information about a terminal device that needs to be authenticated, that is, information about a terminal device that initiates the DEP registration.

S1304: The application deployment party returns an authentication message to the DEP control unit, and the DEP control unit receives the authentication information from the application deployment party.

After receiving the DEP authentication request from the DEP control unit, the application deployment party may perform DEP session authentication on the terminal device based on the information of the terminal device in the DEP authentication request, and return the authentication message to the DEP control unit.

The authentication message may mean that the application deployment party successfully authorizes and authenticates the terminal device. Optionally, the application deployment party may also return the authentication message, and the authentication message may also include a result indicating whether authorization and authentication succeed.

S1303 and S1304 are optional steps.

S1305: The DEP control unit completes an authentication process together with the terminal device and the application deployment party based on the authentication information, where an authentication process may be based on a standardized authentication process, for example, based on an EAP-AKA method.

S1306: The DEP control unit sends configuration information of the DEP to the network device, and the network device receives the configuration information of the DEP from the DEP control unit.

The DEP configuration information may include a DEP address allocated to the terminal device. The DEP address may be a character string of a length (for example, 16 bits to 256 bits), and is allocated and managed by the DEP control unit.

The DEP configuration information may further include a priority configuration of the terminal device.

S1307: The network device sends DEP configuration information to the terminal device, and the terminal device receives the DEP configuration information from the network device.

The DEP configuration information sent by the network device to the terminal device may include some or all content included in the DEP configuration information in S1306. In addition to some or all content included in the DEP configuration information in S1306, optionally, the DEP configuration information may further include configuration information of the radio bearer.

In the foregoing embodiments provided in this application, the method provided in embodiments is separately described from perspectives of the network device, the terminal device, and interaction between the network device, the terminal device, and the computing power.

To implement the functions in the method provided in embodiments, the network device and the terminal device each may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and constraints.

Figure 14:
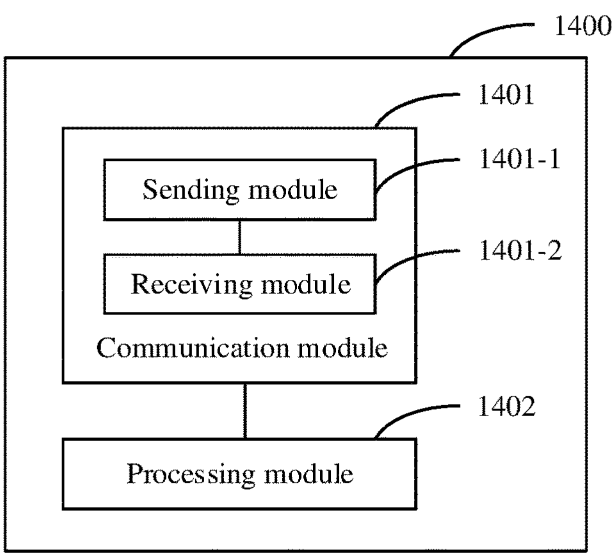
FIG. 14 is a schematic diagram 1 of a structure of a communication apparatus according to an embodiment.

As shown in FIG. 14, an embodiment further provides a communication apparatus 1400. The communication apparatus 1400 may be a terminal device, an apparatus in a terminal device, or an apparatus that can be used together with a terminal device. The communication apparatus 1400 may include modules that are in a one-to-one correspondence with the methods/operations/steps/actions performed by the terminal device in the foregoing method embodiments. The modules may be implemented by a hardware circuit, software, or a combination of a hardware circuit and software. The communication apparatus 1400 may include a communication module 1401 and a processing module 1402. The processing module 1402 is configured to invoke the communication module 1401 to perform a receiving and/or sending function. The communication module 1401 may be further divided into a sending module 1401-1 and a receiving module 1401-2.

When the communication apparatus 1400 is configured to perform an operation performed by the terminal device, the sending module 1401-1 is configured to send a data edge protocol DEP session establishment request message to the network device, where the DEP session establishment request message is used to request to establish a DEP session between the terminal device and a computing power (or a first application on the computing power); and the receiving module 1401-2 is configured to receive configuration information of the DEP session from the network device.

When the communication apparatus 1400 is configured to perform an operation performed by the network device, the receiving module 1401-2 is configured to receive a data edge protocol DEP session establishment request message from the terminal device, where the DEP session establishment request message is used to request to establish a DEP session between the terminal device and a computing power (or a first application on the computing power); and the sending module 1401-1 is configured to send configuration information of the DEP session to the terminal device. Optionally, the sending module 1401-1 is further configured to send uplink DEP data from the terminal device to the computing power (or a first application on the computing power), and/or send downlink DEP data from the first application to the terminal device.

The sending module 1401-1, the receiving module 1401-2, the communication module 1401, and the processing module 1402 are further configured to perform other operations performed by the terminal device or the network device in the foregoing method embodiment. Details are not described herein again.

Division into the modules in embodiments is an example, is merely division into logical functions, and may be other division during actual implementation. In addition, functional modules in embodiments may be integrated into one processor, or each of the modules may exist alone physically, or two or more modules may be integrated into one module. The integrated module may be implemented in a form of hardware, or may be implemented in a form of a software functional module.

Figure 15:
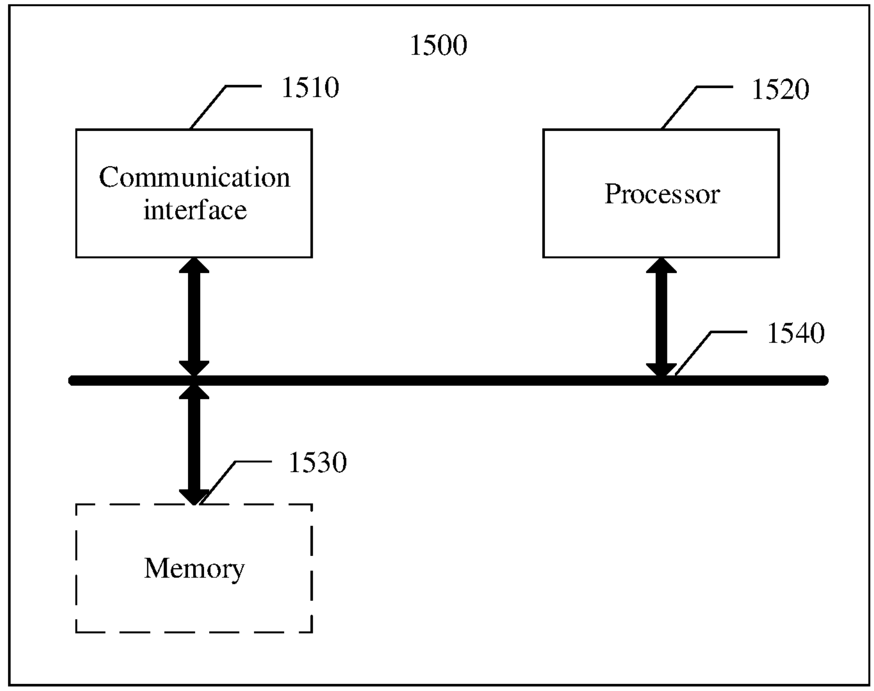
FIG. 15 is a schematic diagram 2 of a structure of a communication apparatus according to an embodiment.

FIG. 15 shows a communication apparatus 1500 according to an embodiment. The communication apparatus 1500 is configured to implement functions of the terminal device or the network device in the foregoing method. When implementing functions of the network device, the apparatus may be a network device, an apparatus in the network device, or an apparatus that can be used together with the network device. When implementing functions of the terminal device, the apparatus may be a terminal device, an apparatus in the terminal device, or an apparatus that can be used together with the terminal device. The apparatus may be a chip system. In this embodiment, the chip system may include a chip, or may include a chip and another discrete component. The communication apparatus 1500 includes at least one processor 1520, configured to implement functions of the terminal device or the network device in the method provided in embodiments. The apparatus 1500 may further include a communication interface 1510. In this embodiment, the communication interface may be a transceiver, a circuit, a bus, a module, or an interface of another type, and is configured to communicate with another device by using a transmission medium. For example, the communication interface 1510 is used for an apparatus in the communication apparatus 1500 to communicate with another device. For example, when the communication apparatus 1500 is a network device, the another device may be a terminal device. When the communication apparatus 1500 is a terminal device, the another apparatus may be a network device. The processor 1520 receives and sends data by using the communication interface 1510, and is configured to implement the method in the foregoing method embodiments.

For example, when a function of the terminal device is implemented, the communication interface 1510 is configured to send a data edge protocol DEP session establishment request message to the network device, where the DEP session establishment request message is used to request to establish a DEP session between the terminal device and a computing power (or a first application on the computing power), and receive configuration information of a DEP session from the network device.

When a function of the network device is implemented, the communication interface 1510 is configured to receive a data edge protocol DEP session establishment request message from the terminal device, where the DEP session establishment request message is used to request to establish a DEP session between the terminal device and a first application, and send configuration information of a DEP session to the terminal device. Optionally, the communication interface 1510 is configured to: based on the DEP session, send uplink DEP data from the terminal device to the computing power (or the first application on the computing power), and/or send downlink DEP data from the computing power (or the first application on the computing power) to the terminal device.

The processor 1520 and the communication interface 1510 may further be configured to perform another corresponding step or operation performed by the terminal device or the network device in the foregoing method embodiments. Details are not described herein again.

The communication apparatus 1500 may further include at least one memory 1530, configured to store program instructions and/or data. The memory 1530 is coupled to the processor 1520. The coupling in this embodiment may be an indirect coupling or a communication connection between apparatuses, units, or modules in an electrical form, a mechanical form, or another form, and is used for information exchange between the apparatuses, the units, or the modules. The processor 1520 may cooperate with the memory 1530. The processor 1520 may execute the program instructions stored in the memory 1530. At least one of the at least one memory may be integrated with the processor.

A non-transitory connection medium between the communication interface 1510, the processor 1520, and the memory 1530 is not limited in this embodiment. In this embodiment, in FIG. 15, the memory 1530, the processor 1520, and the communication interface 1510 are connected through a bus 1540. The bus is represented by a thick line in FIG. 15. A connection manner between other components is merely described as an example and is not limited thereto. The bus may be classified into an address bus, a data bus, a control bus, and the like. For ease of representation, only one thick line is used to represent the bus in FIG. 15, but this does not mean that there is only one bus or only one type of bus.

When the communication apparatus 1400 and the communication apparatus 1500 are chips or chip systems, the communication module 1401 and the communication interface 1510 may output or receive baseband signals. For example, the baseband signal may be the configuration information of the DEP session, the uplink DEP data, the first message, the DEP session establishment request message, or the authorization request in the foregoing method embodiments. When the communication apparatus 1400 and the communication apparatus 1500 are devices, the communication module 1401 and the communication interface 1510 may output or receive radio frequency signals. For example, the radio frequency signal may be a signal transmitted from an antenna or a signal that needs to be transmitted to an antenna. In embodiments, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments. The general-purpose processor may be a microprocessor or any conventional processor or the like. The steps of the method disclosed with reference to embodiments may be directly performed by a hardware processor or may be performed by using a combination of hardware in the processor and a software module.

In embodiments, the memory 1530 may be a non-volatile memory, for example, a hard disk drive (HDD) or a solid-state drive (SSD), or may be a volatile memory, for example, a random-access memory (RAM). The memory is any other medium that can carry or store expected program code in a form of an instruction or a data structure and that can be accessed by a computer but is not limited thereto. The memory in embodiments may alternatively be a circuit or any other apparatus that can implement a storage function, and is configured to store the program instructions and/or the data.

Some or all of the operations and functions that are performed by the terminal and that are described in the foregoing method embodiments, or some or all of the operations and functions that are performed by the network device and that are described in the foregoing method embodiments may be completed by using a chip or an integrated circuit.

To implement the functions of the communication apparatus in FIG. 14 or FIG. 15, an embodiment further provides a chip, including a processor, configured to support the communication apparatus in implementing the functions of the terminal or the network device in the foregoing method embodiments. The chip may be connected to a memory or the chip includes the memory, and the memory may be configured to store program instructions and data that are necessary for the communication apparatus.

An embodiment provides a non-transitory computer-readable storage medium storing a computer program. The computer program includes instructions used to perform the foregoing method embodiments.

An embodiment provides a computer program product including instructions. When the computer program product is run on a computer, the foregoing method embodiments are performed.

It may be understood that names of the messages in this embodiment may be replaced with other names, and this is not limited.

Persons skilled in the art should understand that embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more computer-usable storage media (including but not limited to a disk memory, a CD-ROM, an optical memory, and the like) that include computer-usable program code.

is the embodiments are described with reference to the flowcharts and/or block diagrams of the method, the device (system), and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

Although some embodiments have been described, persons skilled in the art can make changes and modifications to these embodiments once they learn the basic concepts. Therefore, the embodiments are intended to be construed as to cover the embodiments and all changes and modifications.

Clearly, persons skilled in the art can make various modifications and variations to embodiments without departing from their scope. is the embodiments are intended to cover these modifications and variations.

What is claimed is:

1. A data edge protocol-based communication method, comprising:

sending, by a first communication apparatus, a data edge protocol (DEP) session establishment request message to a second communication apparatus, wherein:

the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, the DEP session is located at the DEP layer, a data edge protocol further comprises a unique identifier of the DEP session, and the DEP comprises a field indicating a priority of the DEP session;

selecting the DEP session from a plurality of DEP sessions based on a quality of service (QoS) requirement;

receiving, by the first communication apparatus, configuration information of the DEP session from the second communication apparatus; and sending, by the first communication apparatus, uplink DEP data to the second communication apparatus, wherein the uplink DEP data comprises the unique identifier of the DEP session and the uplink DEP data further comprises one or more types of the following information: the priority of the DEP session, the source DEP address, or the destination DEP address.

2. The data edge protocol-based communication method according to claim 1, wherein the third layer of the radio network protocol layer comprises a radio resource control (RRC) layer.

3. The data edge protocol-based communication method according to claim 1, wherein the DEP layer is located above a media access control (MAC) layer or a physical (PHY) layer.

4. The data edge protocol-based communication method according to claim 1, further comprising:

sending, by the first communication apparatus, a first message to the second communication apparatus, wherein the first message is used to request to perform DEP registration for the first application.

5. The data edge protocol-based communication method according to claim 1, wherein the configuration information of the DEP session comprises the unique identifier of the DEP session.

6. A data edge protocol-based communication method, comprising:

receiving, by a second communication apparatus, a data edge protocol (DEP) session establishment request message from a first communication apparatus, wherein:

the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, a data edge protocol further comprises a unique identifier of the DEP session, and the DEP session is located at the DEP layer;

selecting the DEP session from a plurality of DEP sessions based on a quality of service (QoS) requirement;

sending, by the second communication apparatus, configuration information of the DEP session to the first communication apparatus; and sending, by the first communication apparatus, uplink DEP data to the second communication apparatus, wherein the uplink DEP data comprises the unique identifier of the DEP session and the uplink DEP data further comprises one or more types of the following information: the priority of the DEP session, the source DEP address, or the destination DEP address.

7. The data edge protocol-based communication method according to claim 6, wherein the third layer of the radio network protocol layer comprises a radio resource control (RRC) layer.

8. The data edge protocol-based communication method according to claim 6, wherein the DEP layer is located above a media access control (MAC) layer and a physical (PHY) layer.

9. The data edge protocol-based communication method according to claim 6, wherein the configuration information of the DEP session comprises the unique identifier of the DEP session.

10. The data edge protocol-based communication method according to claim 6, wherein the data edge protocol-based communication method further comprises:

sending, by the second communication apparatus, an authorization request based on the DEP session establishment request.

11. The data edge protocol-based communication method according to claim 6, further comprising:

receiving, by the first communication apparatus, a first message from the second communication apparatus, wherein the first message is used to request to perform DEP registration for the first application; and sending, by the second communication apparatus, a DEP authentication request to a DEP control unit based on the first message, wherein the DEP authentication request is used to request to obtain authentication information of the first communication apparatus, and the authentication information comprises information about whether the first communication apparatus is qualified to use the first application.

12. The data edge protocol-based communication method according to claim 6, further comprising:

receiving, by the second communication apparatus, the configuration information of the DEP session from a DEP control unit.

13. A communication apparatus, applied to a first communication apparatus, comprising:

at least one non-transitory memory, configured to store instructions; and at least one processor, wherein when executing the instructions, the at least one processor is configured to:

send a data edge protocol (DEP) session establishment request message to a second communication apparatus, wherein:

the DEP session establishment request message is used to request to establish a DEP session between the first communication apparatus and a computing power, the DEP session is used to transmit data of a first application, the first communication apparatus, the second communication apparatus, and the computing power all have a function of a DEP layer, the DEP layer is located below a third layer of a wireless network protocol layer, a data edge protocol further comprises a unique identifier of the DEP session, and the DEP session is located at the DEP layer;

select the DEP session from a plurality of DEP sessions based on a quality of service (QoS) requirement;

receive configuration information of the DEP session from the second communication apparatus; and send, by the first communication apparatus, uplink DEP data to the second communication apparatus, wherein the uplink DEP data comprises the unique identifier of the DEP session and the uplink DEP data further comprises one or more types of the following information: the priority of the DEP session, the source DEP address, or the destination DEP address.

14. The apparatus according to claim 13, wherein the third layer of the radio network protocol layer comprises a radio resource control (RRC) layer.

* * * * *